US012680287B2

(12) United States Patent
Halloran et al.

(10) Patent No.: US 12,680,287 B2
(45) **Date of Patent: *Jul. 14, 2026**

(54) RIM JET NOZZLE SYSTEM FOR TOILETS

(71) Applicant: Kohler Co., Kohler, WI (US)

(72) Inventors: Daniel N. Halloran, Fredonia, WI (US); Tony L. Lambert, Sheboygan, WI (US); Randy O. Mesun, Sheboygan, WI (US); Rahul Bose, Sheboygan, WI (US); Keith E. Muellenbach, Sheboygan, WI (US); Sudip Mukerji, Mequon, WI (US); Jessica A. Grev, Winston Salem, NC (US)

(73) Assignee: Kohler Co., Kohler, WI (US)

( * ) Notice: Subject to any disclaimer, the term of this patent is extended or adjusted under 35 U.S.C. 154(b) by 68 days.

This patent is subject to a terminal disclaimer.

(21) Appl. No.: 18/142,319

(22) Filed: May 2, 2023

(65) Prior Publication Data

US 2023/0265644 A1 Aug. 24, 2023

Related U.S. Application Data

(63) Continuation of application No. 16/794,502, filed on Feb. 19, 2020, now Pat. No. 11,668,085.

(Continued)

(51) Int. Cl.

*E03D 11/13* (2006.01)
*B05B 1/04* (2006.01)

(Continued)

(52) U.S. Cl.

CPC .............. *E03D 11/13* (2013.01); *B05B 1/042* (2013.01); *B05B 1/10* (2013.01); *B05B 15/652* (2018.02);

(Continued)

(58) Field of Classification Search

CPC ......... E03D 11/08; E03D 11/13; E03D 11/17; B05B 15/652; B05B 1/042

See application file for complete search history.

(56) References Cited

U.S. PATENT DOCUMENTS 229,326 A 6/1880 Maddock
5,875,499 A * 3/1999 Hoffman .................. E03D 5/08 4/438

(Continued)

FOREIGN PATENT DOCUMENTS

CN 1402807 A 3/2003
CN 1422355 A 6/2003

(Continued)

OTHER PUBLICATIONS

Chinese Office Action for Chinese Application No. 202010124132.0 dated Aug. 23, 2021.

(Continued)

*Primary Examiner* — Janie M Loeppke

(74) *Attorney, Agent, or Firm* — Lempia Summerfield Katz LLC

(57) ABSTRACT

A toilet assembly includes a toilet body and a nozzle system. The toilet body defines a toilet bowl and a rim area disposed along an upper edge of the toilet bowl. The rim area includes a flange defining an opening. The nozzle system includes a nozzle having a first end configured to be fluidly coupled to a water supply conduit and a second end fluidly coupled to the rim area. The second end defines an outlet formed at a compound angle. The connector assembly detachably couples the nozzle to the flange such that the nozzle extends through the opening.

13 Claims, 21 Drawing Sheets

Related U.S. Application Data

(60) Provisional application No. 62/811,983, filed on Feb. 28, 2019.

(51) Int. Cl.

| | |
|---|---|
| ***B05B 1/10*** | (2006.01) |
| ***B05B 15/652*** | (2018.01) |
| ***E03D 9/00*** | (2006.01) |
| ***E03D 9/08*** | (2006.01) |
| ***E03D 11/02*** | (2006.01) |
| ***E03D 11/08*** | (2006.01) |

(52) U.S. Cl.
CPC ................. *E03D 9/00* (2013.01); *E03D 9/08* (2013.01); *E03D 11/08* (2013.01); *E03D 11/02* (2013.01)

(56) References Cited

U.S. PATENT DOCUMENTS

| | | | | |
|---|---|---|---|---|
| 6,115,853 | A | 9/2000 | Shibata et al. | |
| 6,675,399 | B1 * | 1/2004 | Tomita | E03D 9/08 4/422 |
| 7,036,159 | B2 | 5/2006 | Tomita | |
| 9,702,135 | B2 | 7/2017 | Kashirajima et al. | |
| 11,668,085 | B2 * | 6/2023 | Halloran | E03D 9/08 4/420 |
| 2003/0140406 | A1 * | 7/2003 | Miwa | E03D 11/02 4/420 |
| 2004/0068785 | A1 | 4/2004 | Tomita et al. | |
| 2005/0121905 | A1 | 6/2005 | Pecchioli | |
| 2015/0152628 | A1 | 6/2015 | Hirai et al. | |
| 2018/0155912 | A1 | 6/2018 | Kashirajima et al. | |
| 2018/0155913 | A1 * | 6/2018 | Kashirajima | E03D 11/08 |
| 2018/0282987 | A1 * | 10/2018 | Kashirajima | E03D 1/28 |
| 2020/0063418 | A1 | 2/2020 | Mori et al. | |

FOREIGN PATENT DOCUMENTS

| | | | |
|---|---|---|---|
| CN | 206916874 | U | 1/2018 |
| CN | 207357457 | U | 5/2018 |
| CN | 208056228 | U | 11/2018 |
| JP | 2003213775 | A | 7/2003 |
| JP | 2008303616 | A | 12/2008 |
| JP | 2009046835 | A | 3/2009 |

OTHER PUBLICATIONS

Chinese Office Action for Chinese Application No. 202010124132.0 dated Jan. 25, 2021.

Chinese Office Action for Chinese Application No. 202010124132.0 dated Jan. 25, 2021, 16 pages.

* cited by examiner

RIM JET NOZZLE SYSTEM FOR TOILETS

CROSS-REFERENCE TO RELATED PATENT APPLICATIONS

This application is a Continuation under 35 U.S.C § 120 and 37 C.F.R. § 1.53 (b) of U.S. patent application Ser. No. 16/794,502, filed on Feb. 19, 2020 which claims the benefit of and priority to U.S. Provisional Application No. 62/811, 983, filed Feb. 28, 2019, the entire disclosure of which is hereby incorporated by reference herein.

BACKGROUND

The present application relates generally to the field of connectors for fluidly coupling a non-vitreous fluid delivery component to a vitreous plumbing fixture, such as a toilet.

Generally speaking, a toilet can include various openings for fluidly coupling a fluid delivery component (e.g., conduit, rim nozzle, etc.) to the toilet bowl, such as at a sump or a rim of the toilet. Most toilets are typically made from a vitreous china material, which can present significant challenges for connecting a component that is made from a non-vitreous material (e.g., plastic, etc.) to the toilet in a watertight manner. Specifically, most non-vitreous components do not bond well to vitreous material.

Accordingly, it would be advantageous to provide a connector between a non-vitreous fluid delivery component and a vitreous toilet to ensure a substantially watertight connection between the fluid delivery component and the toilet.

SUMMARY

One exemplary embodiment relates to a toilet assembly. The toilet assembly includes a toilet body and a nozzle system. The toilet body defines a toilet bowl and a rim area disposed along an upper edge of the toilet bowl. The rim area includes a flange defining an opening. The nozzle system includes a nozzle having a first end configured to be fluidly coupled to a water supply conduit and a second end fluidly coupled to the rim area. The second end defines an outlet formed at a compound angle. The connector assembly detachably couples the nozzle to the flange such that the nozzle extends through the opening.

Another exemplary embodiment relates to a nozzle system. The nozzle system includes a nozzle and a connector assembly. The nozzle includes a cylindrical outer wall defining a flow passage. The cylindrical outer wall has a first end configured to fluidly couple the nozzle to a water supply conduit and a second end configured to fluidly couple to a rim are of a toilet body. The second end defines an outlet formed at a compound angle. The connector assembly is configured to detachably couple the nozzle to a flange of the toilet body.

Yet another exemplary embodiment relates to a toilet assembly. The toilet assembly includes a toilet body and a nozzle system. The toilet body defines a toilet bowl and a rim area disposed along an upper edge of the toilet bowl. The rim area includes a flange defining an opening. The nozzle system includes a nozzle and a connector assembly. The nozzle has a first end fluidly coupled to a water supply conduit and a second end fluidly coupled to the rim area. The connector assembly couples the nozzle to the flange such that the nozzle extends through the opening. The connector assembly is configured such that an angular position of the nozzle is adjustable without removing the nozzle from the connector assembly.

This summary is illustrative only and is not intended to be in any way limiting.

DETAILED DESCRIPTION

Figure 1:
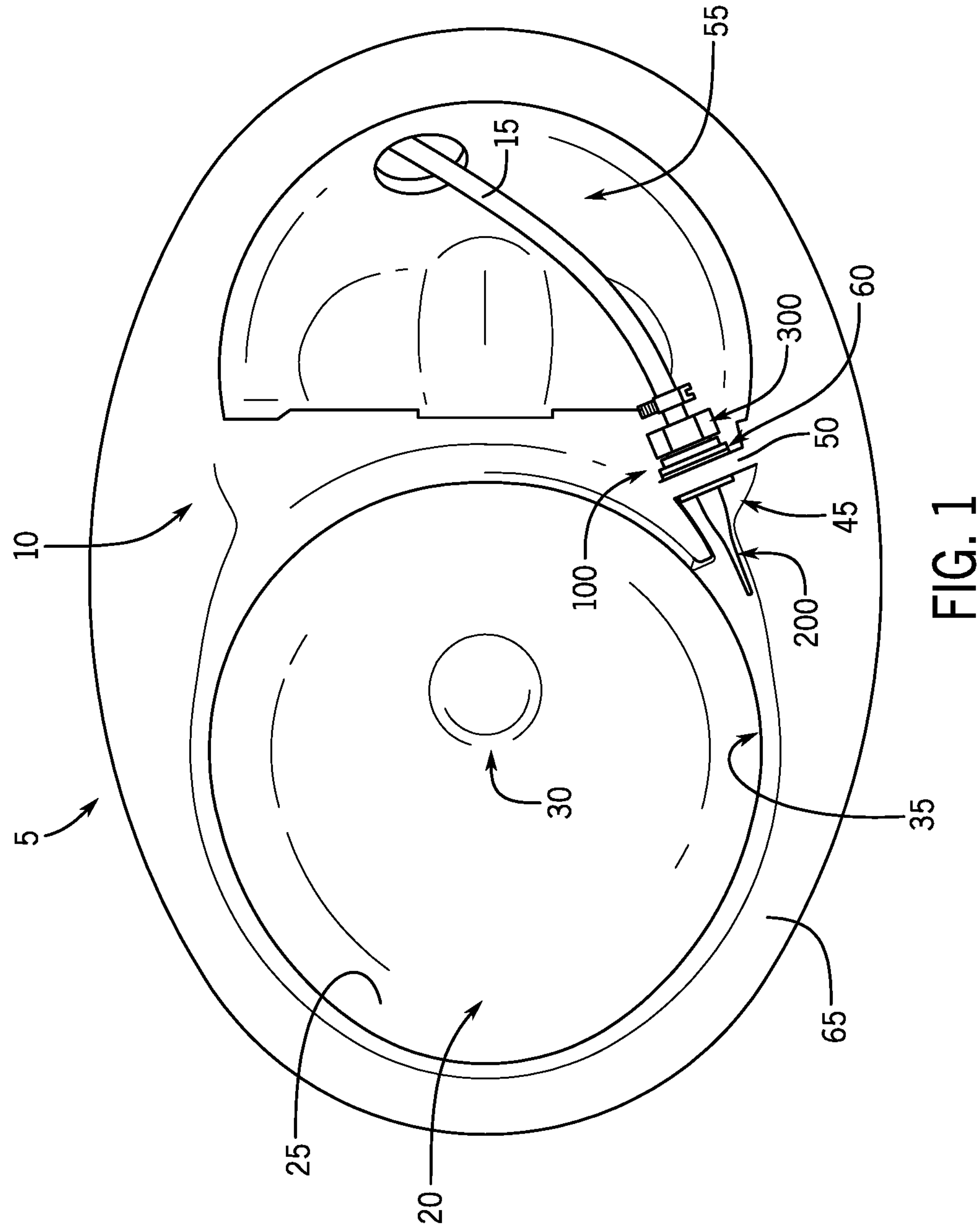
FIG. 1 is a top sectional view of a toilet including a nozzle system, according to an exemplary embodiment.

Referring generally to the figures, a toilet includes a toilet bowl with a trapway, a flushing valve, a jet (e.g., a sump jet, etc.), and a rim with a fluid supply nozzle system. The nozzle system is configured to deliver water from a water supply line (e.g., a household water supply line, a commercial building water supply line, etc.) to a rim area of a toilet bowl. The nozzle system includes a non-vitreous nozzle and a connector assembly configured to sealingly couple the nozzle to a vitreous toilet. According to an exemplary embodiment, the connector assembly is configured to movably couple the nozzle to the toilet. According to an exemplary embodiment, the connector assembly includes a ferrule (e.g., ball, compression ring, seal, etc.) configured to pivotably couple the nozzle to the connector assembly. The connector assembly is configured to allow a position of the nozzle to be adjusted without removing the nozzle from the connector assembly. A repositionable nozzle can, advantageously, reduce splashing and noise associated with water flowing across the surfaces of the toilet bowl. The connector assembly provides a level of adjustability not available in conventional toilet designs.

According to an exemplary embodiment, the connector assembly is a compression-type fitting (e.g., a type of coupling used to connect two pipes or a pipe to a fixture or valve). The connector assembly includes a connector body (e.g., spud, etc.), a sealing member (e.g., sealing member, etc.), a washer, a first nut, a ferrule, and a second nut. The sealing member may be configured to engage with an opening in the toilet and the connector body. The connector body may be configured to engage with the sealing member. The connector body may be configured to press against and expand an inner surface of the sealing member to form a substantially watertight seal between the sealing member and the toilet. The first nut may be configured to engage with the connector body and the washer. Applying torque to the first nut (e.g., tightening the first nut) moves a frusto-conical portion of the connector body towards the nut, which causes the sealing member to expand radially between the rim nozzle and a vitreous portion of the toilet, resulting in a substantially watertight seal between the rim nozzle and the toilet. The nozzle may be configured to be received within a hollow portion of the connector body. The nozzle may be smaller than the hollow portion of the connector body to allow the position of the nozzle to be adjusted. The ferrule may be configured to engage with the nozzle and the connector body to form a substantially watertight seal between the nozzle and the connector body, thereby substantially preventing water from bypassing through the hollow portion of the connector body. According to an exemplary embodiment, the ferrule is clamped to the connector body by the second nut (e.g., fixed in position relative to the connector body) to retain the shank (e.g., position, orientation, etc.) of the nozzle. Unlike conventional compression fittings, the ferrule is configured to provide adjustability between the connector body and the nozzle (e.g., to allow a user to reposition the nozzle without removing the nozzle from the toilet).

Another exemplary embodiment relates to a toilet assembly. The toilet assembly includes a toilet made from a vitreous china material, a rim nozzle made from a non-vitreous material, and a connector assembly for coupling the rim nozzle to the toilet in a substantially watertight manner. The toilet includes a rim having an opening, and a flange (e.g., wall) extending outwardly from the rim adjacent the opening. The connector assembly includes a first bracket disposed in front of the opening and a second bracket overlapping a portion of a rear surface of the flange behind the opening. The rim nozzle is inserted into the opening with a sealing member disposed between a portion of the rim nozzle and a vitreous surface of the flange. The first bracket is coupled to the second bracket with the rim nozzle, the seal, and a portion of the flange disposed therebetween, so as to compress the seal against the vitreous surface of the flange to create a substantially watertight seal between the rim nozzle and the rim.

Yet another exemplary embodiment relates to a toilet assembly. The toilet assembly includes a toilet made from a vitreous china material, a rim nozzle made from a non-vitreous material, and a connector assembly for coupling the rim nozzle to the toilet in a substantially watertight manner. The connector assembly includes a nut and a sealing member. The toilet includes a rim and a secondary chamber extending forward of the rim. The secondary chamber includes a first opening disposed between an interior of the secondary chamber and an area surrounding the toilet, and a second opening disposed between the secondary chamber and the rim. The rim nozzle is disposed through the first opening with the sealing member positioned around a portion of the rim nozzle at the first opening. The nut is coupled to the rim nozzle in front of the first opening. The sealing member is configured to expand radially between the rim nozzle and a vitreous portion of the secondary chamber that defines the first opening in response to coupling the nut to the rim nozzle, so as to create a substantially watertight seal between the rim nozzle and the vitreous portion of the secondary chamber.

According to an exemplary embodiment, the nozzle is a tube defining a flow passage. An end of the tube is angled (e.g., cut or otherwise formed at a compound angle) to help direct water onto the surface of a toilet bowl and to minimize splashing and other fluid losses. The end of the nozzle may be positioned in a rim area of the toilet bowl. The end of the nozzle may be positioned in a rim channel beneath a rim of the toilet. Among other benefits, minimizing flow losses associated with the nozzle increases the effectiveness of the surface cleaning operation. These and other advantageous features with become apparent to those reviewing the present disclosure and figures.

Referring to FIGS. 1-4, a toilet 5 is shown, according to an exemplary embodiment. According to an exemplary embodiment, the toilet 5 is a siphonic toilet (e.g., line-pressure driven, etc.). According to other exemplary embodiments, the toilet 5 is a gravity-fed toilet or other type of toilet. It should be appreciated that the disclosed rim nozzle system may be applied to a variety of toilets that may include a nozzle at a rim area of the toilet for rinsing the toilet bowl. The toilet 5 includes a toilet body 10. The toilet body 10 includes a toilet bowl 20 surrounded circumferentially by a rim 65. Located at the bottom of the toilet bowl 20 is a sump, which houses a predetermined volume of water to seal a trapway that is configured to induce a siphon effect, which provides pressure to suction waste water from the toilet bowl 20 when a flush is activated. A jet is coupled to and in fluid communication with the sump to help induce a siphon in the trapway and perform a flush function.

As shown in FIG. 1, the toilet body 10 is a tankless toilet configured to receive water from a water supply conduit 15 that is connected to a water supply line, such as a normal household supply line that supplies water at a pressure of about 30 psi. In some embodiments, the water supply line may be a water supply line inside a commercial property or another type of building. The water supply conduit 15 may be a pipe, tube, or other water delivery mechanism extending from the water supply line through a wall of the building. In some embodiments, the supply conduit leads from the supply line to a connector (not shown). The connector, such as, for example, a T-connector, allows water to be supplied to the sump through a sump supply conduit and a rim area 35 through a rim supply conduit. According to some embodiments, the T-connector is not required, which is dependent upon the particular valve design used. The sump supply conduit is connected to the jet located at the sump to supply water into the sump. The rim supply conduit is configured to supply water to the rim area 35, which allows water to flow along an inner surface of the toilet bowl 20 through a nozzle system 100 (e.g., a rim jet, etc.)

As shown in FIG. 1, the toilet body 10 includes a toilet bowl 20. The toilet bowl 20 includes a surface 25 defining a cavity 30 into which solid or liquid waste may be deposited. The toilet bowl 20 includes a rim area 35 and a rim 65 proximate to an upper edge of the toilet bowl 20. The rim 65 may extend inward from an outer edge of the toilet bowl 20 so that it covers a small portion of the rim area 35. In some embodiments, the toilet body 10 is made (e.g., cast or otherwise formed) from a single piece of vitreous material such as clay. The toilet body 10 may include one or more openings (e.g., slots, holes, etc.) configured to receive trim, tubing, and/or other components/hardware to facilitate operation of the toilet 5.

Figure 2:
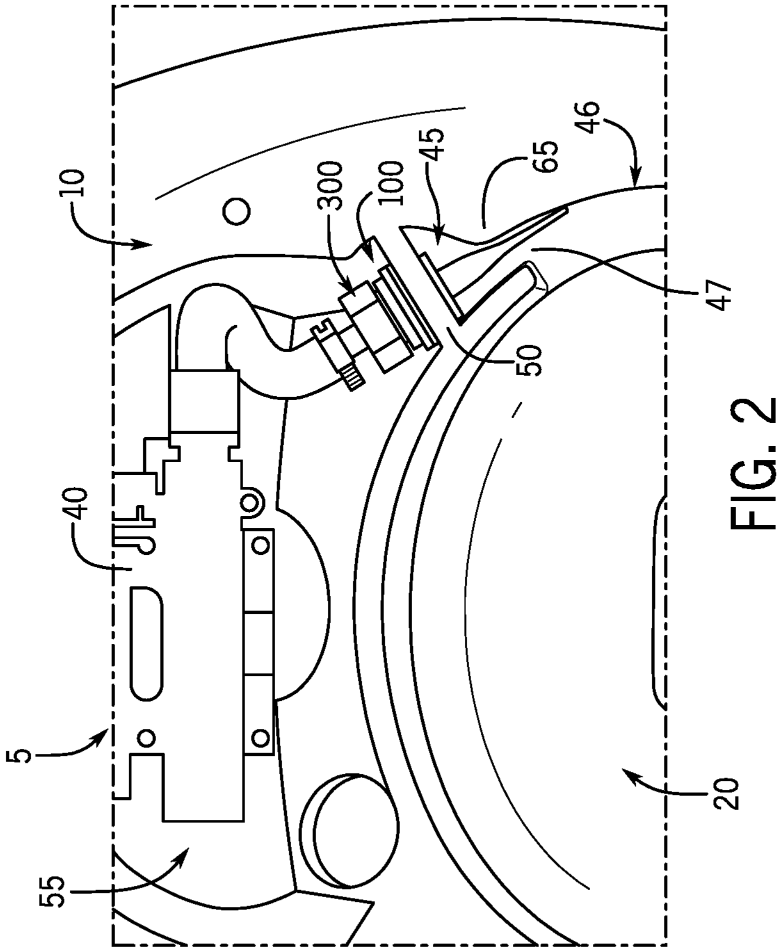
FIG. 2 is a top sectional view of a toilet including a nozzle system, according to an exemplary embodiment.

As shown in FIG. 2, the toilet 5 may include a valve 40 or another water metering device configured to control the flow of water from the water supply conduit 15. In some embodiments, the valve 40 is configured to control the flow of water from the supply conduit 15 to the sump supply conduit and/or the rim supply conduit, so as to eject waste or excrement from the toilet body 10. The valve 40 may be operably coupled to a lever, handle, switch, or another form of actuator. A user may depress or otherwise manipulate the actuator after using the toilet body 10 to remove waste from the toilet body 10. In some embodiments, the valve 40 may be electronically controlled by a controller, which may be configured to open and close the valve 40 after a predetermined time interval. The controller may open and close the valve 40 to initiate a multi-stage flush process that both cleans the toilet bowl 20 and evacuates the toilet bowl 20 during a flush. For example, during a multi-stage flush process according to certain embodiments, once a flush is activated by a user using an activation mechanism such as a handle or a button, the controller opens the valve 40 to supply water to the rim supply conduit. Through the nozzle system 100, water flows along the inner surface of the toilet bowl 20 to rinse and clean the toilet bowl 20 of debris. In particular embodiments, the valve 40 is configured to allow the full pressure and flow from the supply line through the nozzle system 100. By allowing water to flow at full line pressure, water exiting the nozzle system 100 can clean the entire inner surface of the toilet bowl 20 without the use of a ledge or shelf structure on the inner surface of the toilet bowl 20 to help guide the water. Moreover, water flowing out from the nozzle system 100 at full line pressure and flow reduces the need to provide a more compact toilet bowl 20 to ensure that the entire inner surface will be cleaned by the water.

Figure 3:
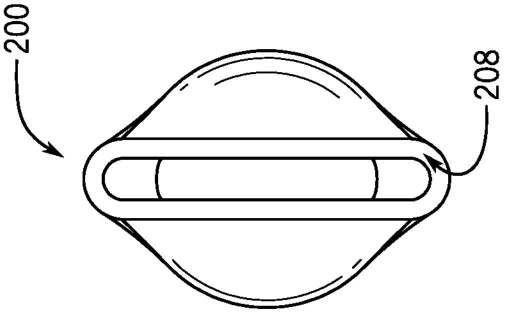
FIG. 3 is a front view of a nozzle, according to an exemplary embodiment.
Figure 4:
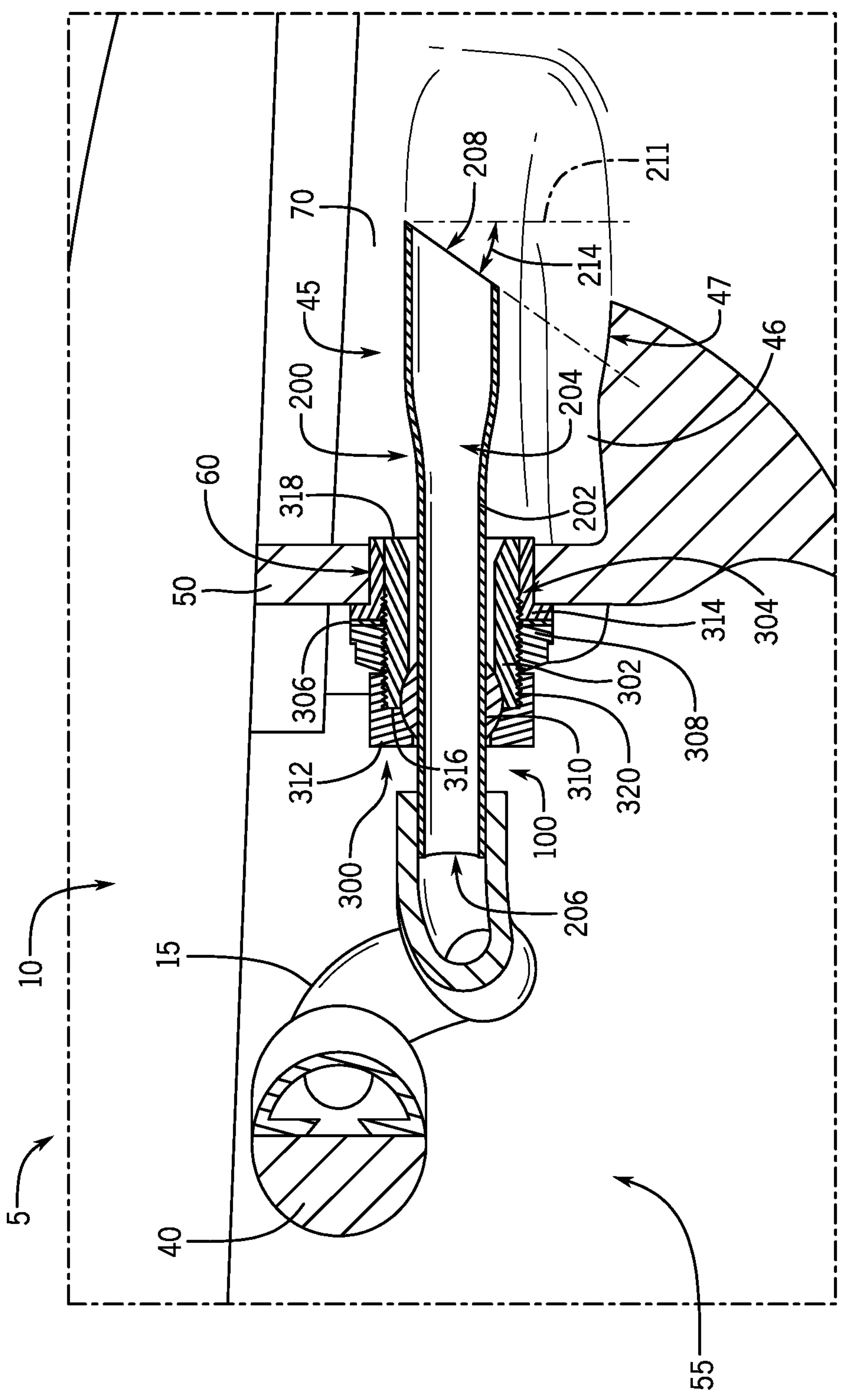
FIG. 4 is a side sectional view of the nozzle system of FIG. 2, according to an exemplary embodiment.

As shown in FIGS. 1-4, the nozzle system 100 is configured to deliver water to the surface 25 of the toilet bowl 20 from the rim area 35 of the toilet bowl 20. As shown in FIGS. 2-3, the toilet body 10 includes a rim channel 45 through which water may be introduced to the toilet bowl 20. The rim channel 45 is at least partially below the rim 65 of the toilet body 10. An inlet to the rim channel 45 includes a wall 50 (e.g., flange, etc.), which separates the rim channel from a rear cavity 55 of the toilet body 10. In other embodiments, the shape and/or position of the wall 50 relative to other parts of the toilet body 10 may be different. As shown in FIG. 4, the wall 50 defines an opening 60 that fluidly couples the rim channel 45 to the rear cavity 55. The nozzle system 100 is engaged with the opening 60 and seals against the opening to prevent water from leaking into the rear cavity 55. The rim channel 45 includes a side wall 46 (e.g., a curved side wall) and a ledge 47 disposed at a lower end of the side wall 46 and extending substantially perpendicular to the side wall below a portion of the nozzle system 100. The rim channel 45 extends in a direction that is approximately tangential to the surface 25 of the toilet bowl 20 so as to reduce the amount of splashing that might otherwise result from water entering the toilet bowl 20 (after which the water will swirl around the bowl).

As shown in FIGS. 1-6, the nozzle system 100 includes a nozzle 200 and a connector assembly 300 configured to detachably (e.g., removably, etc.) couple the nozzle 200 to the toilet body 10. As shown in FIG. 4, the nozzle 200 includes a substantially cylindrical outer wall 202 defining a flow passage 204 though which water may be directed. A first end 206 of the nozzle 200 is fluidly coupled to the water supply conduit 15 (e.g., via valve 40, connective tubing, etc.). A second end 208 of the nozzle 200 is fluidly coupled to the rim channel 45. As shown in FIGS. 3-6, the second end 208 of the nozzle 200 is flared in at least one direction with respect to the first end 206, such that a dimension of the flow passage 204 at the second end 208 is greater than a dimension of the flow passage 204 at the first end 206. The shape of the second end 208 of the nozzle 200 may be formed by crimping or bending one end of a metal tube or other formable material.

The second end 208 of the nozzle 200 is configured to direct water in a direction that is substantially tangential to the surface 25 of the toilet bowl 20. As shown in FIGS. 2 and 4, a central axis of the nozzle 200 is oriented substantially parallel to a flow direction through the rim channel 45 (e.g., away from the wall 50). The second end 208 of the nozzle 200 is disposed (e.g., positioned) adjacent to and in contact with a curved portion of the rim channel 45, shown as channel wall 46, proximate to an outlet of the rim channel 45. As shown in FIGS. 2 and 4-6, the second end 208 of the nozzle 200 is angled so as to prevent fluid from splashing against a ceiling (e.g., upper wall, etc.) of the rim channel 45 and to reduce the likelihood of water detaching from the surface 25 of the toilet bowl 20.

Figure 5:
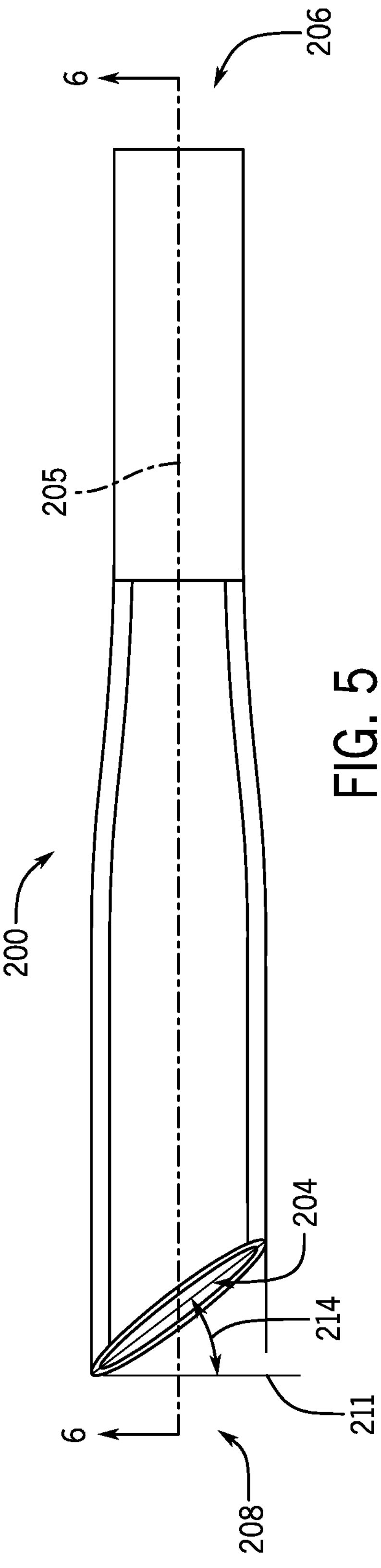
FIG. 5 is a side view of the nozzle of FIG. 3.
Figure 6:
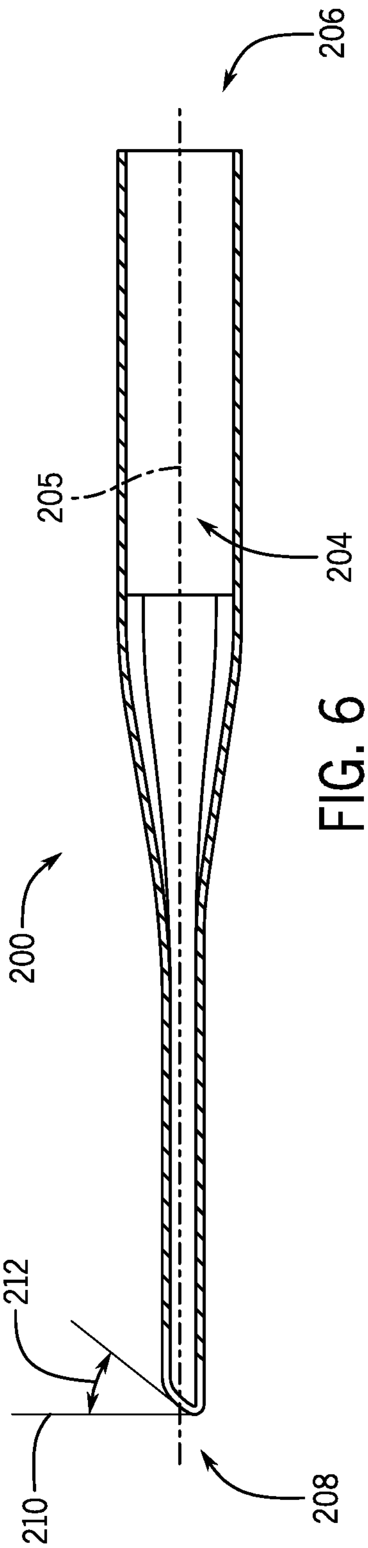
FIG. 6 is a top sectional view of the nozzle of FIG. 3.

As shown in FIGS. 2 and 6, the second end 208 of the nozzle 200 is cut or otherwise formed at an angle (e.g., a compound angle). According to an exemplary embodiment, the second end 208 forms an oblique angle (e.g., a main angle), shown as first angle 212 of approximately 45° relative to a first reference line 210 that is normal to a central axis 205 of the nozzle 200. In other embodiments, the first angle 212 may be different. Advantageously, the first angle 212 helps direct water toward the curved wall of the rim channel 45, thereby preventing water leaving through the second end 208 of the nozzle 200 from escaping from the surface 25 of the toilet bowl 20. As shown in FIGS. 4-5, the second end 208 is also angled (e.g., at a second oblique angle) relative to a second, substantially vertical reference line, shown as second reference line 211, which is oriented normal to the ceiling of the rim channel 45 (e.g., oriented normal to both the central axis 205 and the first reference line 210). According to the exemplary embodiment of FIGS. 3-4, the second angle 214 is approximately 55°. In other embodiments, the first angle 212 and the second angle 214 may be different. Advantageously, the second angle 214 helps to direct water downward and away from the ceiling of the rim channel 45, which helps to prevent splashing and other fluid losses.

FIG. 4 shows the nozzle system 100, at a cross-section through the connector assembly 300, according to an exemplary embodiment. The connector assembly 300 is configured to detachably (e.g., removably, etc.) couple the nozzle 200 to the toilet body 10 and to prevent water from leaking into the rear cavity 55 through the opening 60 in the wall 50. As shown in FIG. 4, the connector assembly 300 includes a connector body 302, a sealing member 304, a washer 306, a first nut 308, a ferrule 310 (e.g., a ball, a connection ring, a seal, etc.), and a second nut 312. In alternative embodiments, the connector assembly 300 may include additional, fewer, and/or different components.

As shown in FIG. 4, the sealing member 304 is a substantially cylindrical ring. The sealing member 304 may be made from an elastomer (e.g., rubber), soft plastic, or another compliant material. The sealing member 304 includes a substantially circumferential extension or flange 314 at a first end of the sealing member 304. The flange 314 is configured to engage with a first surface of the wall 50 and prevents the sealing member 304 from being pushed through the opening 60. The flange 314 also helps to prevent fluid from leaking between the sealing member 304 and the wall 50. As shown in FIG. 4, an outer diameter of the connector body 302 is slightly less than an inner diameter of the sealing member 304. An outer diameter of the sealing member 304 is slightly less than a diameter of the opening 60. According to an exemplary embodiment, the sealing member 304 is configured to engage with the connector body 302 along an outer surface of the connector body 302, thereby forming a substantially watertight seal between the connector body 302 and the sealing member 304. Correspondingly, the outer surface of the sealing member 304 is configured to engage with the wall 50 along an outer edge of the opening 60 so as to form a substantially watertight seal between the sealing member 304 and the wall 50.

The connector body 302 is configured to expand the sealing member 304 against the wall 50. As shown in FIG. 4, a first end 316 of the connector body 302 is flared outward such that an outer diameter of the first end 316 of the connector body 302 is greater than an outer diameter of a second end 318 of the connector body 302. In other words, the connector body 302 has a generally frusto-conical profile. According to an exemplary embodiment, the outer diameter of the first end 316 of the connector body 302 is approximately the same as an outer diameter of the sealing member 304 (e.g., slightly less than the diameter of the opening 60). As the sealing member 304 moves toward the first end 316 of the connector body 302, the force on the sealing member 304, acting toward the wall 50, increases. The sealing member 304 expands in a radial direction (e.g., outward toward the wall 50), forming a substantially watertight seal between the wall 50 and the sealing member 304. The force between the sealing member 304 and the wall 50 prevents movement of the connector body 302 and the sealing member 304 relative to the wall 50.

As shown in FIG. 4, the connector body 302 includes a threaded interface 320 that extends from the second end 318 of the connector body 302 to a point approximately mid-way between the first end 316 and the second end 318. The first nut 308 is configured to engage with the threaded interface 320. An inner surface (e.g., rightmost surface as shown in FIG. 4) of the first nut 308 is configured to engage with the washer 306, which is sandwiched between the first nut 308 and the flange 314. In an alternative embodiment, the first nut 308 may be configured to engage directly with the sealing member 304.

As shown in FIG. 4, the first nut 308 is configured to position the connector body 302 relative the sealing member 304. The first nut 308 is configured to apply a force to draw the connector body 302 outward through the opening 60 (e.g., from the rim channel 45 toward the rear cavity 55) and to expand the sealing member 304 toward the wall 50. A method of coupling the connector assembly 300 to the toilet body 10 will be described in further detail with reference to FIGS. 5-17.

As shown in FIG. 4, the nozzle 200 is positioned within a hollow portion (e.g., hollow passage, etc.) of the connector body 302 and extends through the connector body 302, from the rear cavity 55 of the toilet body 10 to the rim channel 45. The nozzle system 100 includes a ferrule 310 configured to engage with and seal against both the nozzle 200 and an inner edge of the connector body 302. According to an exemplary embodiment, the outer surface of the ferrule 310 is substantially spherical in shape. An outer diameter of the ferrule 310 is slightly larger than an inner diameter of the connector body 302 at the second end 318 of the connector body 302. Among other benefits, the spherical shape of the ferrule 310 allows the position of the nozzle 200 to be adjusted relative to the connector body 302 without sacrificing sealing performance. As shown in FIG. 4, the nozzle 200 is configured to be received in a hole or opening through a center of the ferrule 310. Like the sealing member 304, the ferrule 310 may be formed from rubber, soft plastic, or another compliant material to improve its sealing performance. The ferrule 310 may be configured to deform slightly toward the nozzle 200 in response to an application of pressure on the outer surfaces of the ferrule 310, which can, advantageously, help to secure the nozzle 200 in place relative to the connector body 302.

As shown in FIG. 4, the second nut 312 engages with the ferrule 310 to secure the ferrule 310 in position relative to the connector assembly 300. A first end of the second nut 312 includes a hole configured to receive the nozzle 200. A second end of the second nut 312 is configured to engage with the threaded interface 320. As shown in FIG. 4, the ferrule 310 is sandwiched between the second nut 312 and the connector body 302. The second nut 312 forces the ferrule 310 against the inner edge of the connector body 302, increasing the force required to move the ferrule 310 (and the nozzle 200) relative to the remainder of the connector assembly 300 (e.g., relative to the connector body 302, etc.). A method of positioning the nozzle 200 relative to the connector assembly 300 will be described in more detail with reference to FIGS. 7-19.

The design and arrangement of components used to couple the nozzle 200 to the toilet body 10 should not be considered limiting. Many alternatives are possible without departing from the inventive concepts disclosed herein. For example, the edges of the connector body 302 or the second nut 312 may be chamfered to improve sealing performance. Additionally, one or more dimensional parameters (e.g., the diameter of the nozzle, the thickness of the ferrule 310 and/or sealing member 304, etc.) may be varied in order to meet flow rate requirements, and to ensure a reliable seal to prevent water from leaking into the rear cavity 55.

Figure 7:
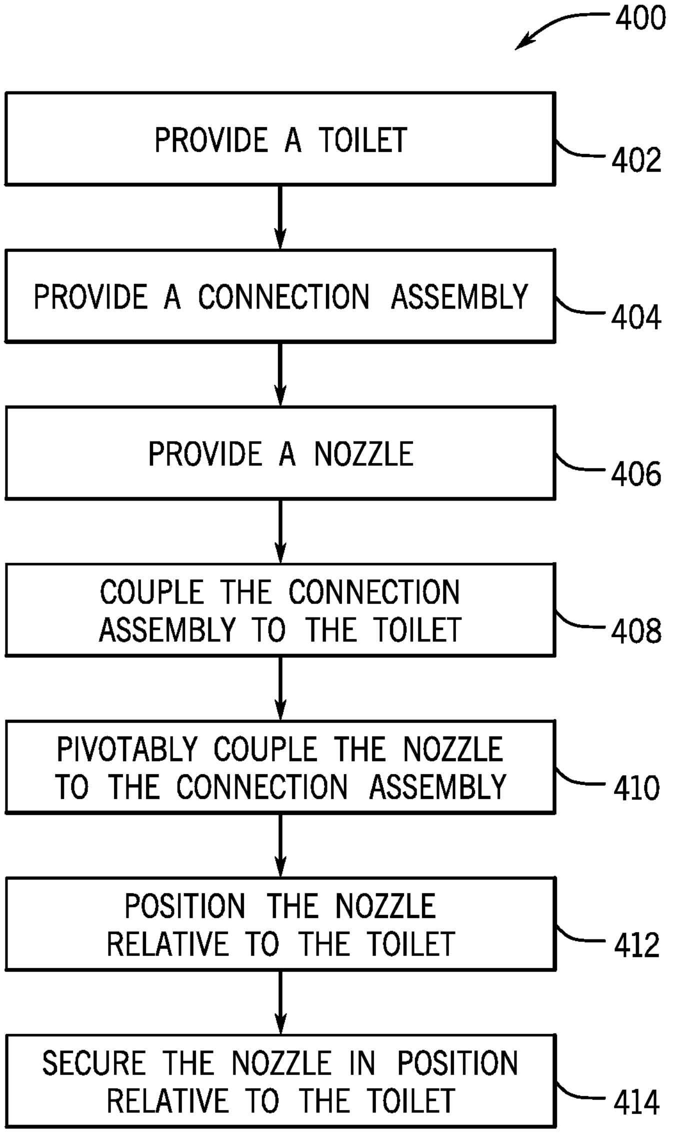
FIG. 7 is a block diagram of a method of making a toilet, according to an exemplary embodiment.

A method 400 of making a toilet 5 is shown in FIG. 7, according to an exemplary embodiment. The method 400 includes providing a toilet including a toilet bowl (operation 402), providing a nozzle system including a connector assembly (operation 404) and a nozzle (operation 406), coupling the connector assembly to the toilet (operation 408), pivotably coupling the nozzle to the connector assembly (operation 410), positioning the nozzle relative to the toilet (operation 412), and securing the nozzle in position relative to the toilet (operation 414). The details of the foregoing operations 402-414 are illustrated and described with reference to FIGS. 8-19.

In operations 402-406, a toilet body 10 and a nozzle system 100 are provided. The toilet body 10 may be identical or substantially similar to the toilet body 10 of FIG. 1. The toilet body may be configured to mount directly to a wall of a restroom in a household or commercial property. According to an exemplary embodiment, the toilet body 10 includes a toilet bowl 20 configured to receive waste in solid or liquid form. The toilet body 10 may include a rim channel beneath a rim 65 of the toilet body 10. The toilet body 10 may include a rear cavity 55 configured to receive a valve for the toilet body 10. The toilet body 10 may include a wall (e.g., a vitreous interface, etc.) separating the rim channel 45 from the rear cavity 55. The wall 50 may include an opening 60 configured to receive the nozzle system 100. The nozzle 200 and the connector assembly 300 may be identical or substantially similar to the nozzle 200 and the connector assembly 300 described with reference to FIGS. 1-4.

Figure 9:
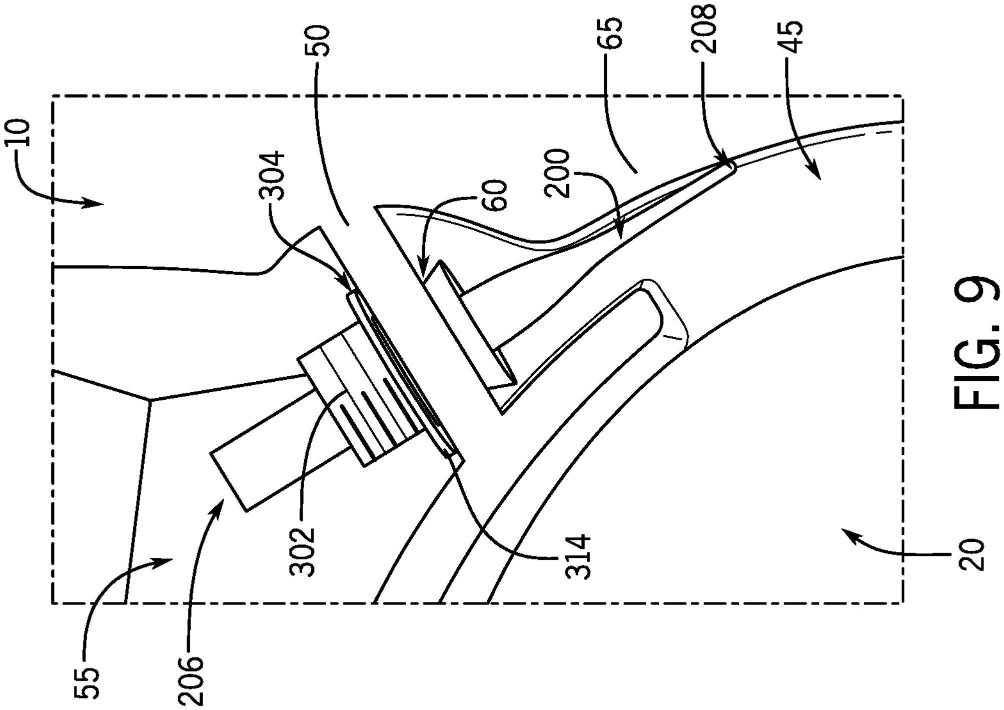
FIG. 9 is a top view of the connector body and sealing member of FIG. 8 inserted into a toilet, according to an exemplary embodiment.
Figure 8:
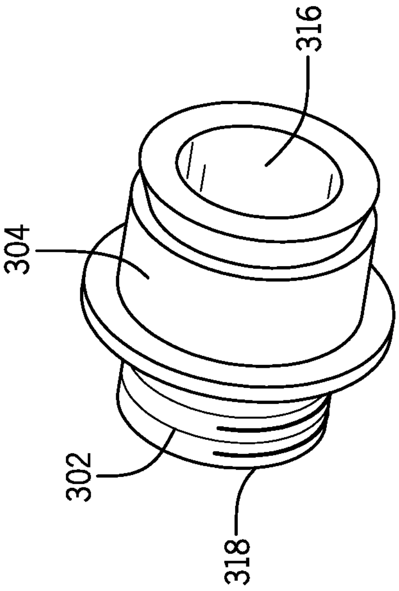
FIG. 8 is a perspective view of a connector body and a sealing member for the nozzle system of FIG. 2, according to an exemplary embodiment.

In operation 408, the connector assembly 300 is inserted into the opening 60 on the toilet body 10 and coupled thereto. As shown in FIG. 8, operation 408 includes installing a sealing member 304 onto a connector body 302. Operation 408 may include inserting the sealing member 304 over a second end 318 of a connector body 302 and forcing (e.g., pushing, etc.) the sealing member 304 toward a first end 316 of the connector body 302. As shown in FIG. 8, the sealing member 304 is pushed up against a flared portion of the connector body 302. As shown in FIG. 9, a user or technician may insert the combination of the sealing member 304 and the connector body 302 through the opening 60 in the wall 50. The sealing member 304 and the connector body 302 may be inserted into the opening 60 from a rear cavity 55 side of the opening 60. A flange 314 of the sealing member 304 may be arranged to contact a surface of the wall 50 that at least partially defines the rear cavity 55.

Figure 11:
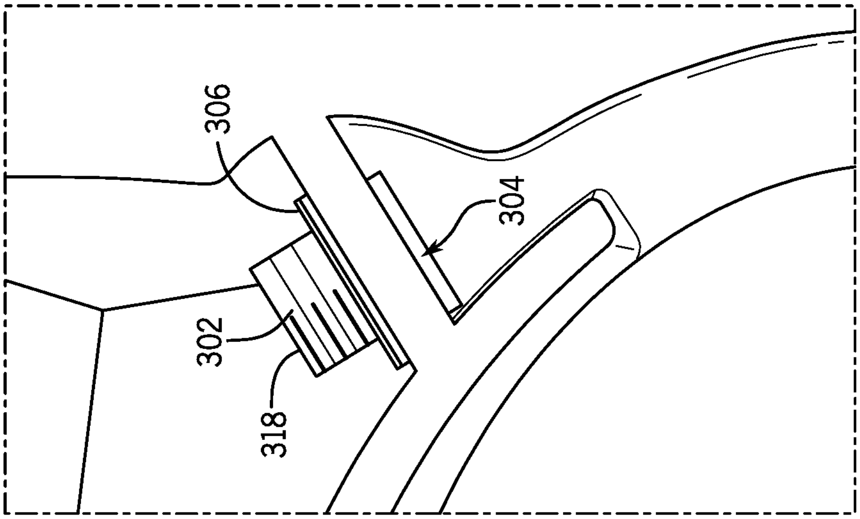
FIG. 11 is a top view of the washer of FIG. 10 engaged with the sealing member of FIG. 8, according to an exemplary embodiment.
Figure 10:
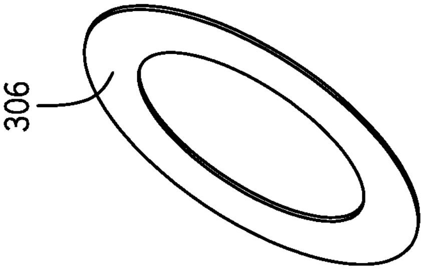
FIG. 10 is a perspective view of a washer for the nozzle system of FIG. 2, according to an exemplary embodiment.
Figure 13:
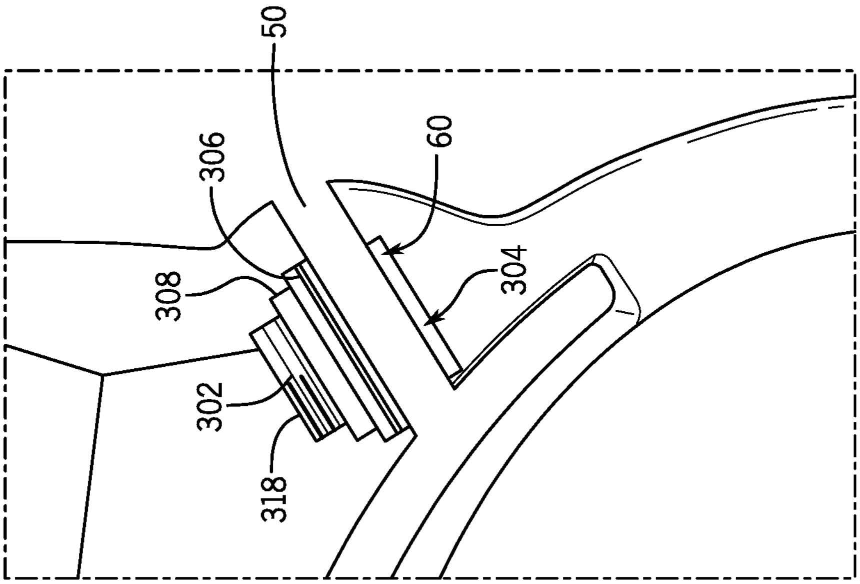
FIG. 13 is a top view of the first nut of FIG. 12 engaged with the connector body of FIG. 8, according to an exemplary embodiment.
Figure 12:
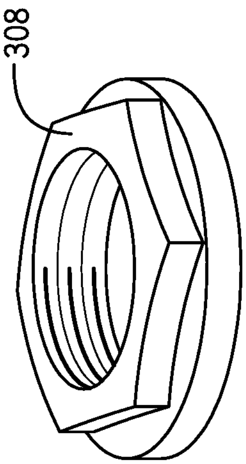
FIG. 12 is a perspective view of a first nut for the nozzle system of FIG. 2, according to an exemplary embodiment.

As shown in FIGS. 10 and 11, a washer 306 is inserted onto the connector body 302 and placed in contact with the flange 314 of the sealing member 304. Alternatively, the washer 306 may be inserted onto the connector body 302 before inserting the connector body 302 into the opening 60. Among other benefits, the washer 306 helps to distribute a compressive force applied by a first nut 308 to the flange 314. As shown in FIGS. 12 and 13, the first nut 308 is threaded onto the connector body 302 from the second end 318 of the connector body 302. According to an exemplary embodiment, a torque is applied to the first nut 308 to draw the connector body 302 out through the opening 60 and toward the rear cavity 55. As the flared portion of the connector body 302 is drawn into the sealing member 304, the sealing member 304 expands and presses against an inner surface of the opening 60. The sealing member 304 forms a watertight seal between the connector body 302 and the wall 50 and secures the connector body 302 in position relative to the wall 50.

In operation 410, the nozzle 200 is pivotably coupled to the connector assembly 300. As shown in FIG. 9, operation 410 includes inserting the nozzle 200 through a hollow portion of the connector body 302. The nozzle 200 may be inserted into the connector body 302 from either side of the wall 50 (e.g., from the rear cavity 55 toward the rim channel 45, or alternatively, from the rim channel 45 toward the rear cavity 55).

Figure 15:
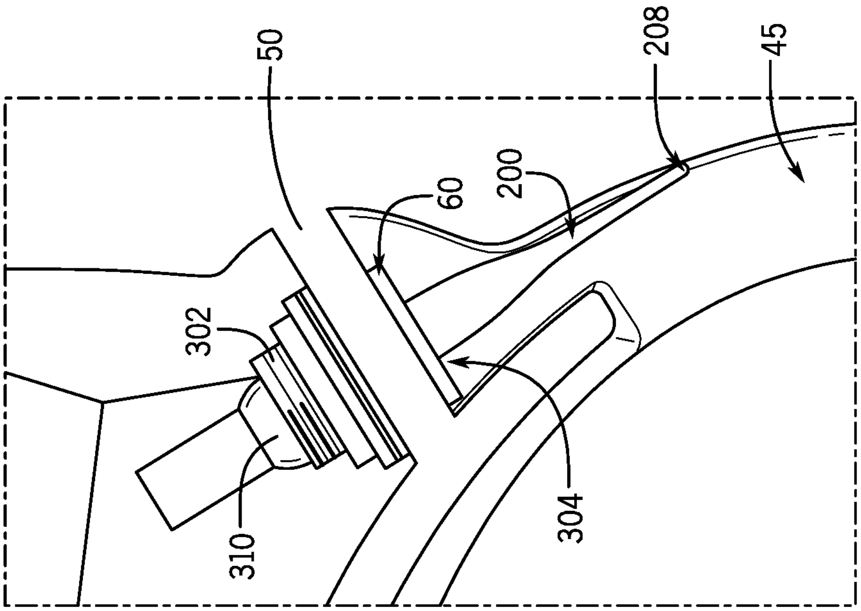
FIG. 15 is a top view of the ferrule of FIG. 14 engaged with connector body of FIG. 8, according to an exemplary embodiment.
Figure 14:
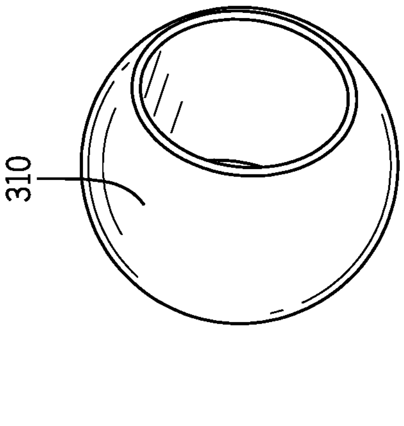
FIG. 14 is a perspective view of a ferrule for the nozzle system of FIG. 2, according to an exemplary embodiment.

As shown in FIGS. 14-15, operation 410 includes inserting a ferrule 310 over the first end 206 the nozzle 200 and engaging the ferrule 310 with an inner edge of the connector body 302. The ferrule 310 may be dimensioned to stretch or deform slightly when being installed onto the nozzle 200 to prevent water from leaking between the ferrule 310 and the nozzle 200. Among other benefits, the ferrule 310 facilitates repositioning of the nozzle 200 within the rim channel 45. An axial position of the nozzle 200 (e.g., a position of the nozzle 200 along a central axis of the connector body 302, etc.) may be modified by sliding the ferrule 310 along the surface of the nozzle 200. The pitch of the nozzle 200 (e.g., a vertical position of the second end 208 of the nozzle 200 in the rim channel 45, a horizontal position of the second end 208 of the nozzle 200 in the rim channel 45, etc.) may be modified by pivoting the nozzle 200 about a center of the ferrule 310.

In operation 412, the position of the nozzle 200 relative to the toilet body 10 (e.g., the position of the nozzle 200 within the rim channel 45, the position of the nozzle 200 relative to the connector assembly 300, etc.) is adjusted so as to reduce splashing and increase the effectiveness of the surface cleaning operation. The position of the nozzle 200 may be adjusted manually by manipulating the first end 206 or the second end 208 of the nozzle 200. The nozzle 200 may be pivoted about the center of the ferrule 310 to adjust the pitch of the nozzle 200 (e.g., a vertical position of the second end 208 of the nozzle 200 within the rim channel 45 as shown in FIG. 16, and/or a horizontal position of the second end 208 of the nozzle 200, into and out of the page as shown in FIG. 16).

Figure 16:
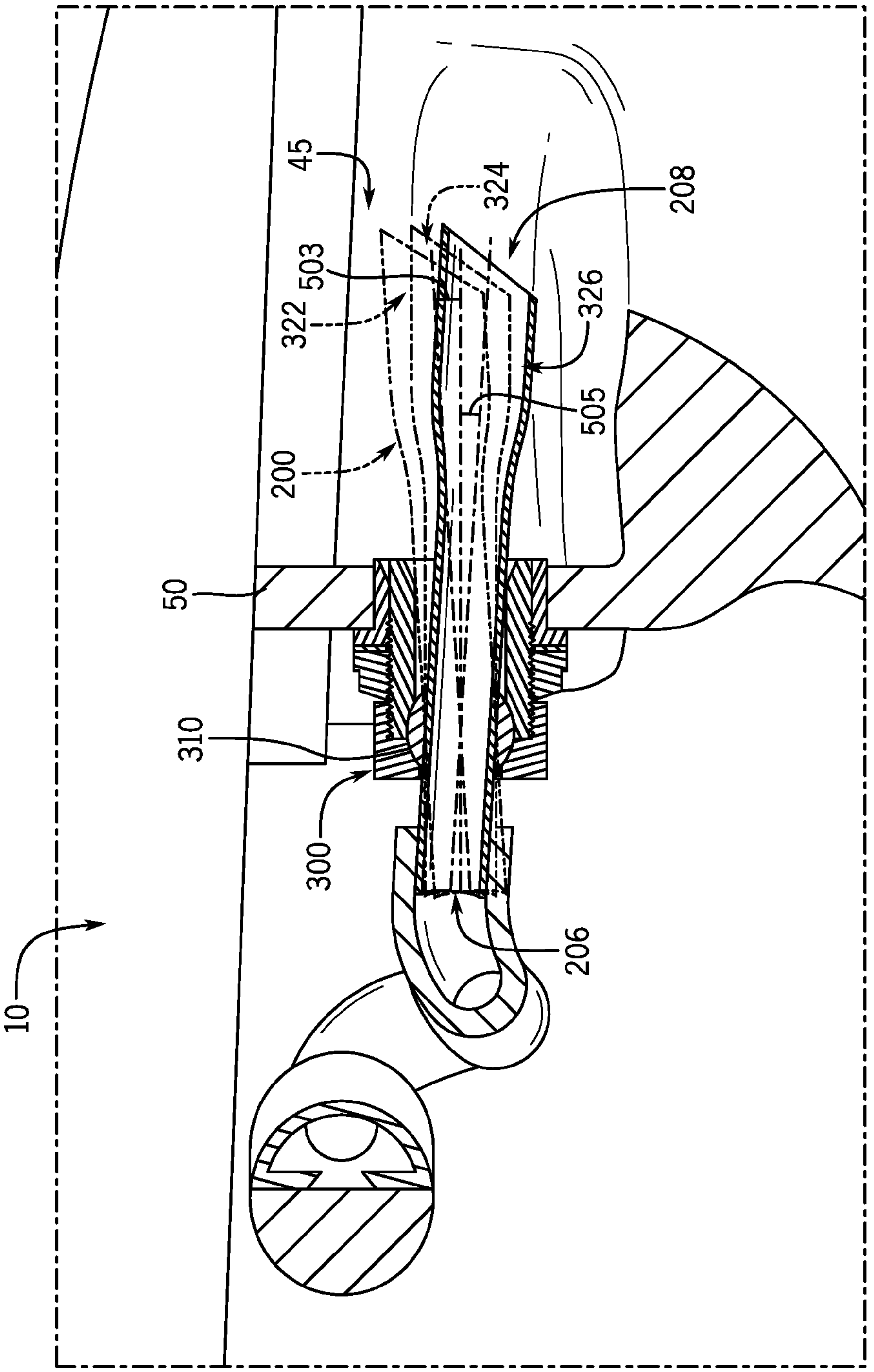
FIG. 16 is a side sectional view of the nozzle system of FIG. 2, showing different positions of a nozzle, according to an exemplary embodiment.

FIG. 16 shows the nozzle 200 positioned at different locations within the rim channel 45 (e.g., with the second end 208 of the nozzle 200 at different vertical positions in the rim channel 45, at different angular positions with respect to a central axis of the connector body 302, etc.). As shown in FIG. 16, the allowable range of motion of the second end 208 of the nozzle 200 is at least partly determined based on a difference between the inner diameter of the connector body 302 and the outer diameter of the nozzle 200. In a first vertical position 322 (e.g., angular position 503), the second end 208 of the nozzle 200 is positioned proximate to the upper wall of the rim channel 45. In a second vertical position 324, the second end 208 of the nozzle 200 is positioned mid-way between the upper wall and the lower wall. In a third vertical position 326 (e.g., angular position 505), the second end 208 of the nozzle 200 is positioned proximate to the lower wall of the rim channel 45.

Figure 18:
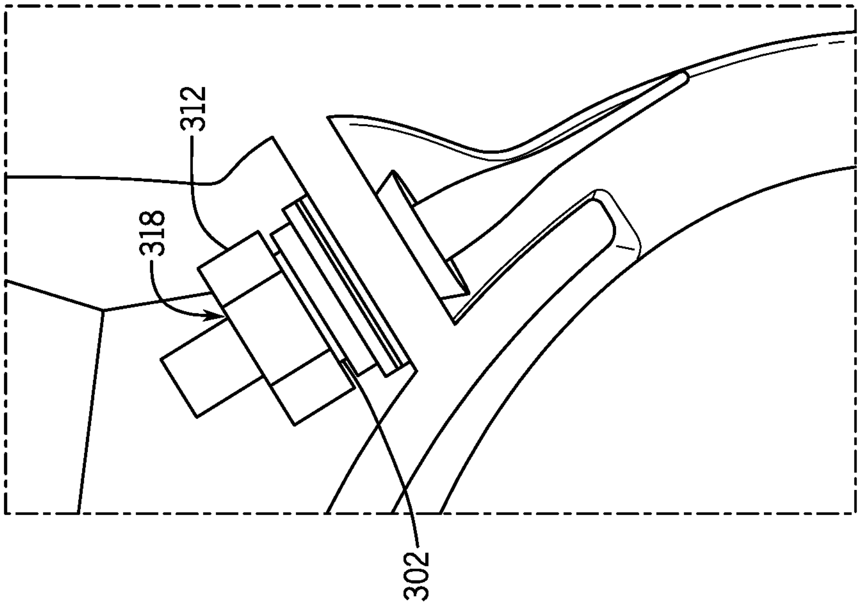
FIG. 18 is a top view of the second nut of FIG. 17 engaged with the connector body of FIG. 8, according to an exemplary embodiment.
Figure 17:
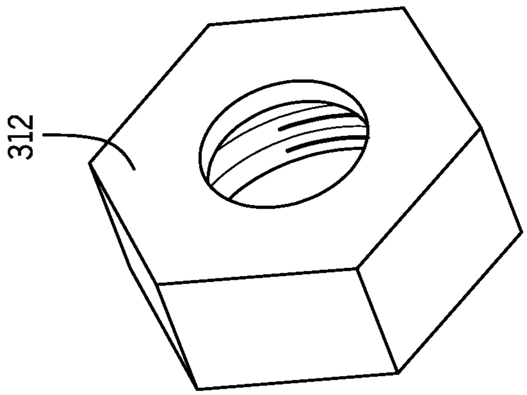
FIG. 17 is a perspective view of a second nut for the nozzle system of FIG. 2, according to an exemplary embodiment.

In operation 414, the nozzle 200 is secured in position relative to the toilet body 10. As shown in FIGS. 17-18, a second nut 312 is threaded onto the second end 318 of the connector body 302. As the second nut 312 is rotated onto the connector body 302, an inner edge of the second nut 312 is brought into contact with the ferrule 310 (see also FIG. 4). The second nut 312 applies a force (e.g., an axial force) to the ferrule 310, sandwiching the ferrule 310 between the second nut 312 and the connector body 302, and compressing the ferrule 310 against the nozzle 200. The force required to reposition the nozzle 200 increases with the torque applied to the second nut 312.

Figure 19:
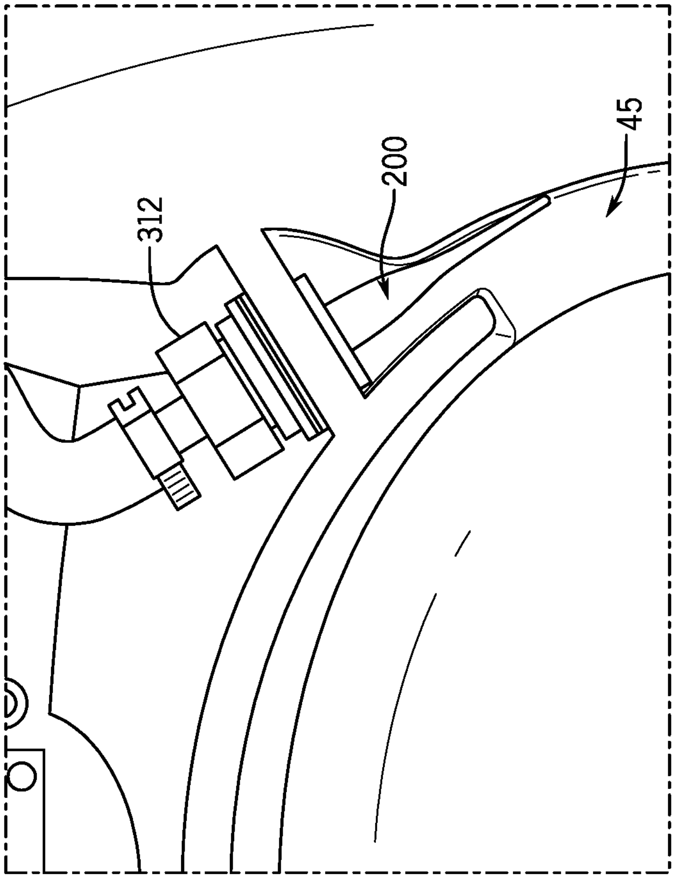
FIG. 19 is a top sectional view of the toilet of FIG. 2 including a nozzle system coupled to a water line, according to an exemplary embodiment.
Figure 21:
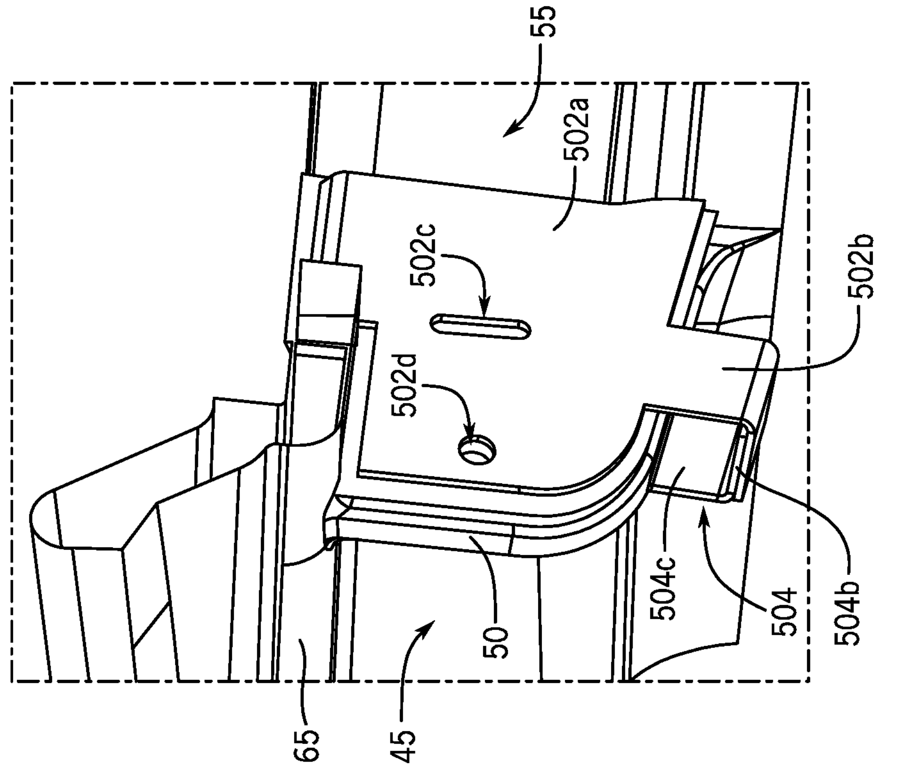
FIGS. 20-21 are partial perspective views of a nozzle system including a clamp assembly, according to another exemplary embodiment.
Figure 20:
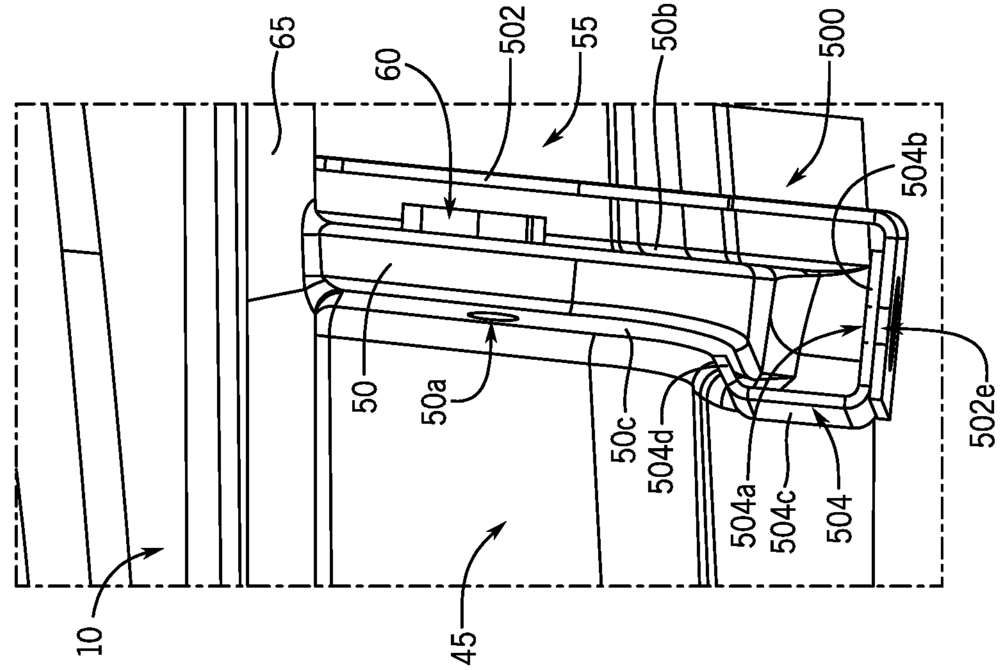

The method 400 may additionally include operations to fluidly couple the nozzle 200 to the water supply conduit 15 or valve. As shown in FIG. 19, a hose fluidly couples the nozzle 200 to a flow control valve. In order to connect the hose to the nozzle 200, a hose clamp (e.g., a worm gear hose clamp, a spring action hose clamp, etc.) is inserted over the hose. The hose is then inserted onto the first end 206 of the nozzle 200. The hose clamp is tightened to secure the hose in place.

In some embodiments, the method 400 additionally includes operations to readjust or reposition the nozzle 200 within the rim channel 45. The method may include removing or loosening the second nut 312 to reduce the compressive force on the ferrule 310. The method may include manually adjusting the position of the nozzle 200 so as to redirect the flow of water from the nozzle 200. The method may include retightening the second nut 312 to secure the nozzle 200 in position. A mechanism for readjusting the nozzle 200 may be particularly advantageous in situations where the flow control valve is replaced or during installation of the toilet.

The design of the connector assembly 300 described with reference to FIGS. 1-4 is provided for illustrative purposes only. Many alternatives are possible without departing from the inventive concepts disclosed herein. For example, referring to FIGS. 20-26, a nozzle system of the toilet body 10 is shown to include a clamp assembly 500 (e.g., connector assembly) for coupling the nozzle 200 to the wall 50, according to another exemplary embodiment. The clamp assembly 500 can, advantageously, help to maintain a position of the nozzle 200 relative to the rim channel 45. The clamp assembly 500 includes a first member 502 (e.g., a support member) and a second member 504 (e.g., a retaining body) adjustably coupled to the first member 502. According to another exemplary embodiment, the first member 502 and the second member 504 are integrally formed with each other to define a unitary structure. The first member 502 and the second member 504 are configured to be adjusted relative to each other, so as to maintain a clamping force of the assembly 500 relative to the wall 50, the details of which are discussed below.

Still referring to FIGS. 20-26, the first member 502 includes a generally planar portion 502*a* that is configured to be positioned adjacent a rear surface 50*b* of the wall 50. The rear surface 50*b* corresponds generally to the second end 208 of the nozzle 200 when the nozzle 200 is coupled to the wall 50. The generally planar portion 502*a* may have a surface profile that is complementary to the rear surface 50*b*. According to an exemplary embodiment, the first member 502 is a plate made from a substantially rigid material, such as metal, plastic, or the like. The generally planar portion 502*a* defines an elongated opening 502*c* for receiving at least a portion of the second end 208 of the nozzle 200 therein. According to the exemplary embodiment shown, the elongated opening 502*c* is complementary to an outer surface profile of at least a portion of the second end 208. According to another exemplary embodiment, the generally planar portion 502*a* is coupled to the nozzle 200 at or near the second end 208. The generally planar portion 502*a* also defines one or more holes 502*d* for coupling the first member 502 to the wall 50 through corresponding holes 50*a* in the wall 50 (e.g., using one or more fasteners 508, etc.).

The first member 502 further includes an extension 502*b* extending from a lower portion of the generally planar portion 502*a*. The extension 502*b* extends downwardly away from the generally planar portion 502*a* and outwardly in a substantially perpendicular orientation relative to the generally planar portion 502*a* toward a front surface 50*c* of the wall 50. The extension 502*b* defines a generally "L" shaped bracket for coupling to the second member 504. A portion of the extension 502*b* defines a hole 502*e* for receiving a fastener 506 therein. The second member 504 is generally "L" shaped and includes a first portion 504*b* configured to at least partially overlap and be adjustably coupled to the perpendicular portion of the extension 502*b*. The first portion 504*b* defines an opening 504*a* configured to be aligned with the hole 502*e*, such that the fastener 506 can be received therein to couple the second member 504 to the first member 502. According to an exemplary embodiment, at least one of the hole 502*e* and the opening 504*a* is elongated to permit relative adjustment between the second member 504 and the first member 502. According to another exemplary embodiment, the first portion 504*b* and the perpendicular portion of the extension 502*b* are integrally formed with each other to define a unitary structure between the first member 502 and the second member 504.

The second member 504 further includes a second portion 504*c* extending from an end of the first portion 504*b* in a substantially perpendicular orientation toward the wall 50. In other words, the second portion 504*c* faces, and is generally parallel to, the generally planar portion 502*a*. The second member 504 also includes a third portion 504*d* extending at an angle from an end of the second portion 504*c* back toward the first portion 504*b*. According to the exemplary embodiment shown, a distal end of the third portion 504*d* is configured to engage the front surface 50*c* of the wall 50, so as to create an interference condition between the second member 504 and the wall 50.

Figure 22:
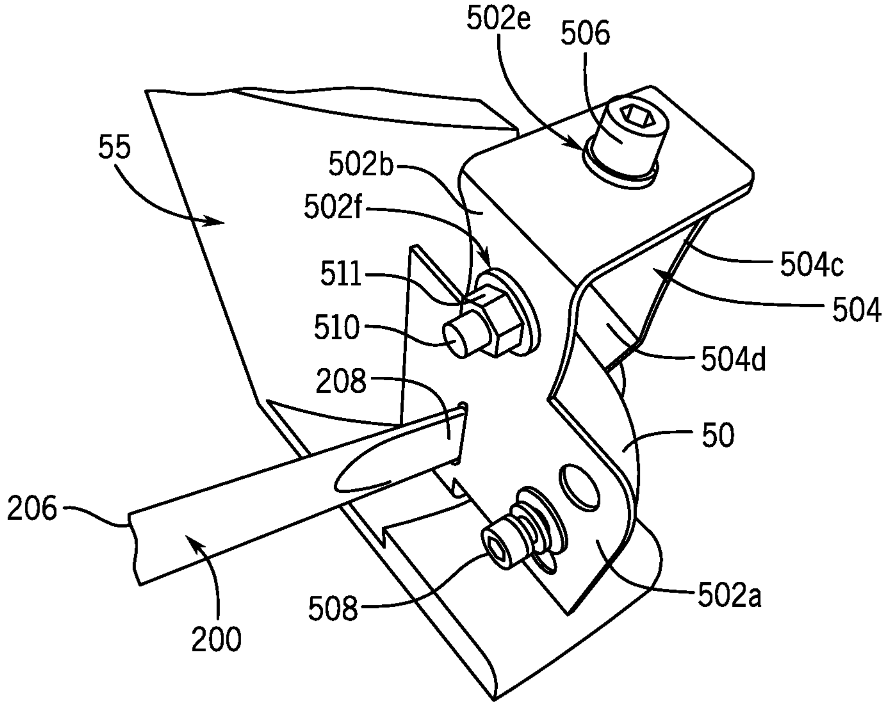
FIGS. 22-24 are partial perspective views of a prototype version of the clamp assembly of FIGS. 20-21, according to an exemplary embodiment.
Figure 23:
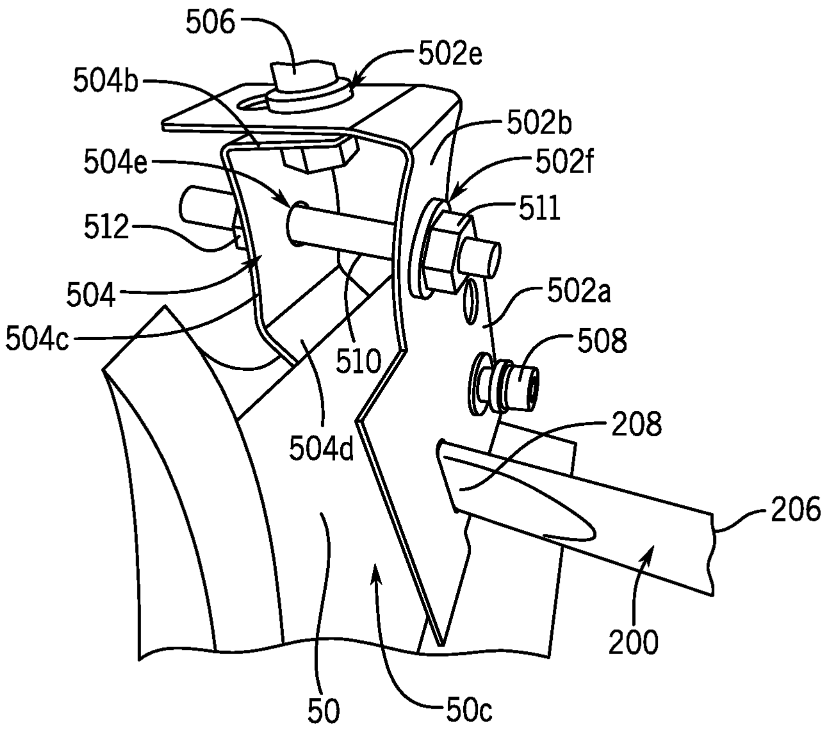
Figure 24:
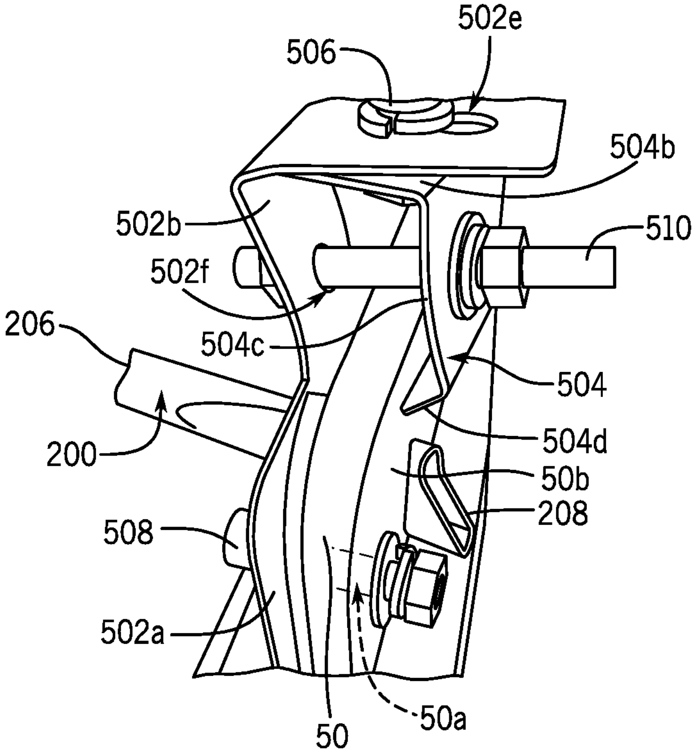

For example, as shown in FIGS. 22-24, a fastener, shown as a threaded rod 510, is received through an opening 502*f* of the extension 502*b* and through an opening 504*e* of the second portion 504*c* opposite the extension 502*b*. Nuts 511, 512 are threadably coupled at opposite ends of the thread rod 510 adjacent the extension 502*b* and the second portion 504*c*, respectively. The nuts 511, 512 can be adjusted relative to the threaded rod 510, so as to urge the second member 504 and the first member 502 toward each other. In this way, the third portion 504*d* will be urged against the front surface 50*c* and the generally planar portion 502*a* will be urged against the rear surface 50*b*, thereby effectively clamping the first member 502 and the second member 504 against the wall 50. According to other exemplary embodiments, a bolt or other type of fastener can be adjustably coupled to the extension 502*b* and the second portion 504*c* to clamp the first member 502 and the second member 504 against the wall 50.

Figure 25:
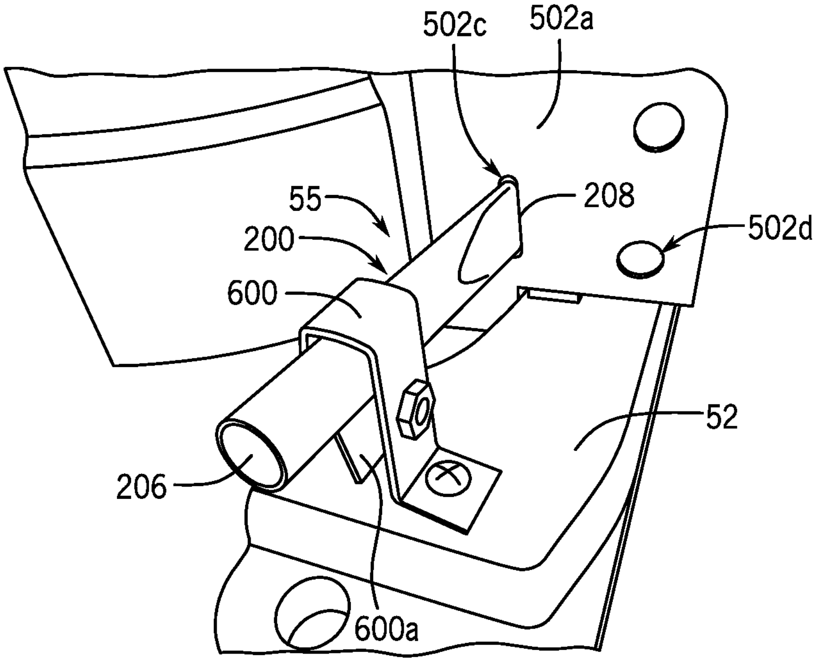
FIGS. 25-26 are partial perspective views of a prototype nozzle system including a bracket, according to another exemplary embodiment.
Figure 26:
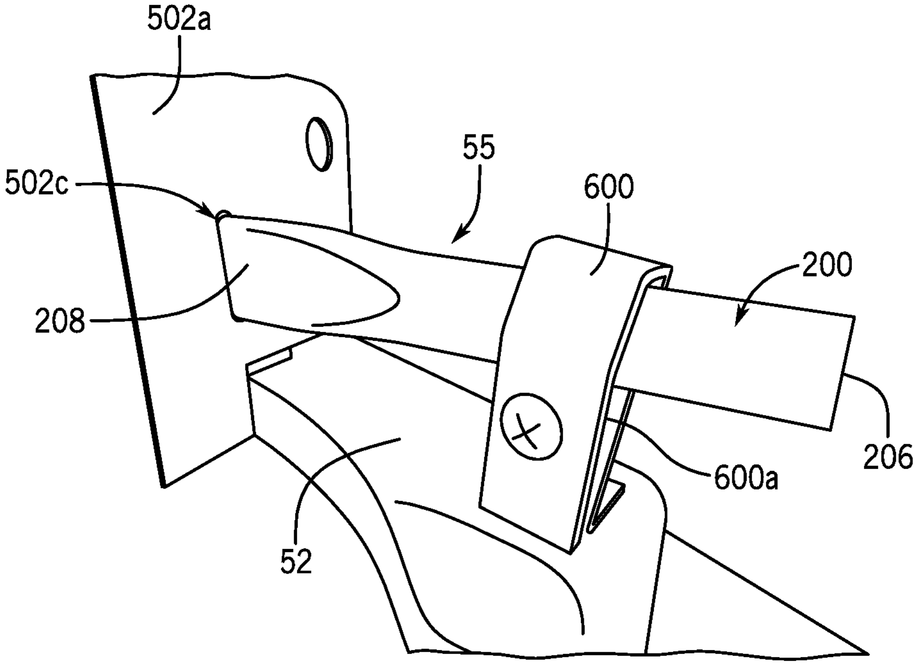

Referring to FIGS. 25-26, the nozzle 200 is shown to include a bracket 600 (e.g., hanger, guide, etc.), so as to help position the nozzle tip (e.g., the second end 208 of the nozzle 200) directly against the vertical rim wall that defines the rim channel 45 of the toilet body 10. The bracket 600 is coupled between a portion of the nozzle 200 near the first end 206 and a wall 52 of the toilet body 10 (e.g., a wall that is oriented perpendicular to the wall 50 and extends forward of the wall 50). The bracket 600 is generally planar and defines an "L" shape where the bracket 600 is coupled to the wall 50. The bracket 600 may be coupled directly to a vitreous portion of the toilet body 10 (e.g., wall 52). The bracket 600 may include a receiving portion 600*a* for receiving the nozzle 200 at or near the first end 206. As shown in FIGS. 25-26, the receiving portion 600*a* substantially surrounds the nozzle 200 (e.g., on at least three sides of the nozzle 200). According to an exemplary embodiment, the receiving portion 600*a* is adjustable to allow for a user or an installer to modify a clamping force of the bracket 600 relative to the nozzle 200 (e.g., using an adjustable clamping bolt, etc.). The bracket 600 may be made from a flexible or deformable material, such as metal, aluminum, or the like. In this way, the bracket 600 can be selectively adjusted relative to the nozzle 200 and/or the wall 52 to change a position of the nozzle tip relative to the vertical rim wall of the toilet body 10, so as to maintain a substantially tangential orientation between the second end 208 of the nozzle 200 and the toilet body 10.

Figure 27:
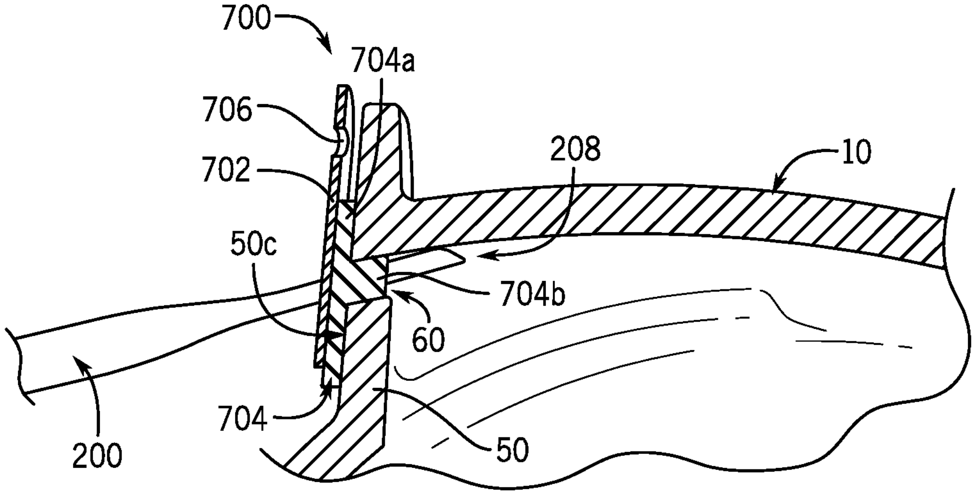
FIG. 27 is a top sectional view of a nozzle system including a connection assembly, according to another exemplary embodiment.

FIG. 27 shows a top sectional view of a portion of a connector assembly 700, according to another exemplary embodiment. The connector assembly 700 includes a generally planar support member 702 and a sealing member 704. The support member 702 is configured to be positioned adjacent to the front surface 50*c* of the wall 50. In the exemplary embodiment of FIG. 27, the support member 702 has a surface profile that is complementary to (e.g., conforms to) the front surface 50*c*. The support member 702 defines an elongated opening (not shown) for receiving at least a portion of the nozzle 200 therein (e.g., for receiving a portion of the nozzle 200 at an intermediate position near the second end 208 of the nozzle 200). The support member 702 also defines one or more holes 706 for coupling the support member 702 to the wall 50 through corresponding holes 50*a* in the wall 50 (e.g., using one or more fasteners, etc.). The sealing member 704 is configured to engage with the nozzle 200 and the wall 50 to prevent water from leaking through the opening 60 (e.g., during a flush event). The sealing member 704 also helps to position the second end 208 relative to the wall 50 and to prevent movement of the second end 208 once the support member 702 is coupled to the wall 50.

As shown in FIG. 27, the sealing member 704 includes a base 704*a* and an extension 704*b* disposed at an intermediate position (e.g., half-way) between opposing ends of the base 704*a*. The extension 704*b* extends outwardly from the base 704*a* in substantially perpendicular orientation, such that the sealing member 704 defines a "T" shape. The sealing member 704 also defines an elongated opening (not shown) that extends through the extension 704*b* for receiving the nozzle 200 therein. The elongated opening may be complementary to the outer profile of the nozzle 200 to prevent rotation of the nozzle 200 relative to the sealing member 704. As shown in FIG. 27, the sealing member 704 is "sandwiched" or otherwise disposed between the support member 702 and the wall 50 as is sealingly engaged with the front surface 50*c* of the wall surrounding the nozzle 200. The extension 704*b* is received within the opening 60 in the wall 50, in a space between the nozzle 200 and the wall 50. According to an exemplary embodiment, the extension 704*b* is also sealingly engaged with the nozzle 200 and the wall 50 along an inner perimeter of the opening 60. The sealing member 704 may be made from an elastomer (e.g., rubber), soft plastic, or another compliant material.

Figure 28:
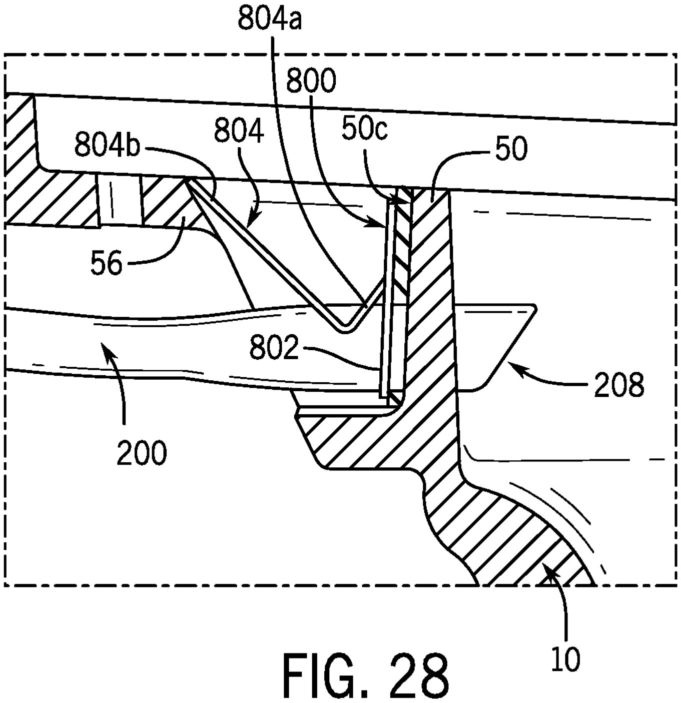
FIG. 28 is a side sectional view of a nozzle system including a connection assembly, according to another exemplary embodiment.

Referring to FIG. 28, a connector assembly 800 is shown to include a clip type fastening mechanism for detachably coupling the nozzle 200 to the wall 50, according to an exemplary embodiment. The connector assembly 800 includes a generally planar support member 802 and a retaining body 804 coupled thereto. The support member 802 is configured to be positioned adjacent to the front surface 50*c* of wall 50 and has a surface profile that is complementary to the front surface 50*c*. The support member 802 defines a central opening (not shown) configured to receive the nozzle 200 therein. In some embodiments, the central opening may be complementary to an outer profile of the nozzle 200 and configured to facilitate positioning the second end 208 of the nozzle 200 within the opening 60 in the wall 50.

The retaining body 804 is configured to detachably couple the connector assembly 800 to the toilet body 10. As shown in FIG. 28, the retaining body 804 includes a first portion 804*a* coupled to the support member 802 along an upper edge of the central opening. The first portion 804*a* extends downwardly (e.g., vertically downward) from the support member 802 at an angle relative to the support member 802. The retaining body 804 includes a second portion 804*b* coupled to a lower end of the first portion 804*a* and extending upwardly at an angle from the lower end of the first portion 804*a*. Together, the first portion 804*a* and the second portion 804*b* form a "V" shaped structure extending forward of the support member 802, away from the wall 50. Accordingly to an exemplary embodiment, the retaining body 804 and the support member 802 are integrally formed as a single unitary body. In other embodiments, the retaining body 804 may be welded or otherwise coupled to the support member 802.

The retaining body 804 is flexible and is configured to engage with the toilet body 10 to secure the nozzle 200 in position with respect to the wall 50. The retaining body 804 (and support member 802) may be made from aluminum, plastic, spring steel, or another suitably flexible yet rigid material. As shown in FIG. 28, an upper end of the second portion 804*b* (e.g., distal end opposite the lower end of the first portion 804*a*) is configured to engage with a ledge 56 of the toilet body 10 forward of the wall 50. To engage the retaining body 804 with the toilet body 10, a user compresses the upper end of the second portion 804 toward the support member 802. After placing the support member 802 adjacent to the front surface 50*c*, the user may release the upper end of the second portion 804*b* to engage the upper end with the ledge 56. In this way, the first portion 804*a* and the second portion 804*b* form a spring clip mechanism to engage the support member 802 with the toilet body 10 and thereby prevent movement of the nozzle 200. Accordingly to an exemplary embodiment, the connector assembly 800 additionally includes a sealing member (not shown) disposed at least partially between the support member 802 and the wall 50. According to an exemplary embodiment, the sealing member used for the connector assembly 800 of FIG. 28 may be the same or substantially similar to the sealing member 704 described with reference to FIG. 27.

Figure 29:
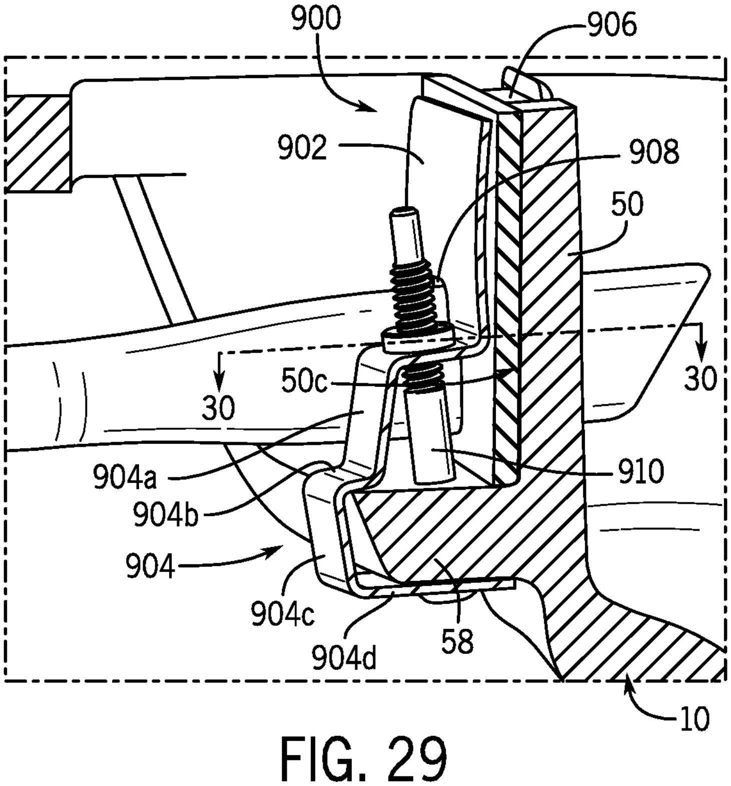
FIG. 29 is a partial perspective view of a nozzle system including a connection assembly, according to another exemplary embodiment.
Figure 30:
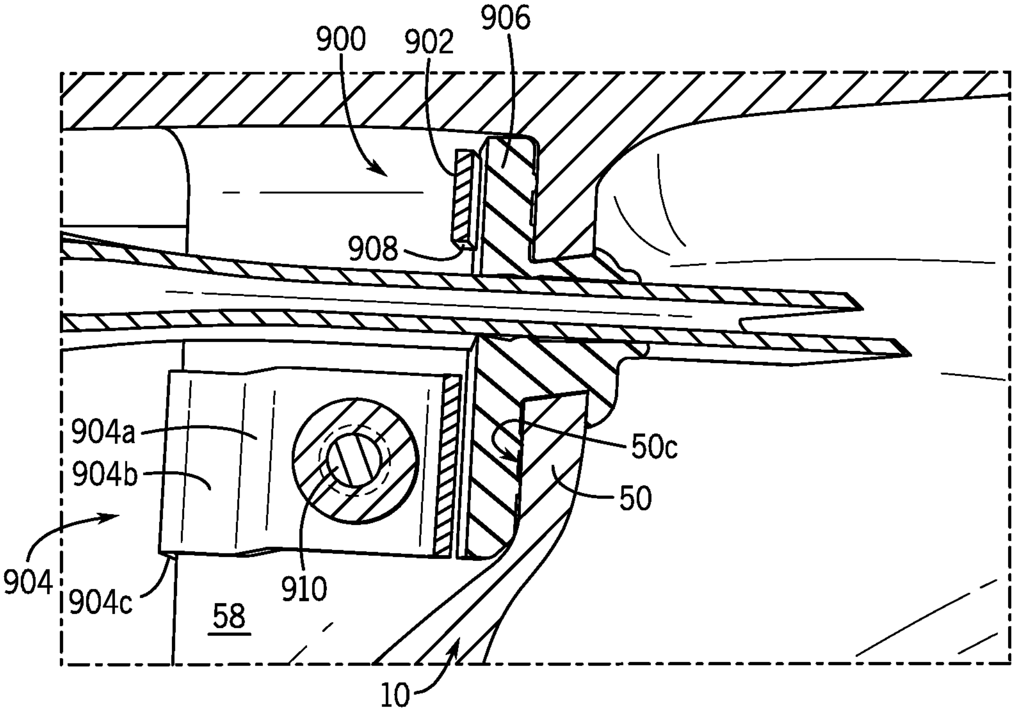
FIG. 30 is a top sectional view of the nozzle system and connection assembly of FIG. 29.
Figure 31:
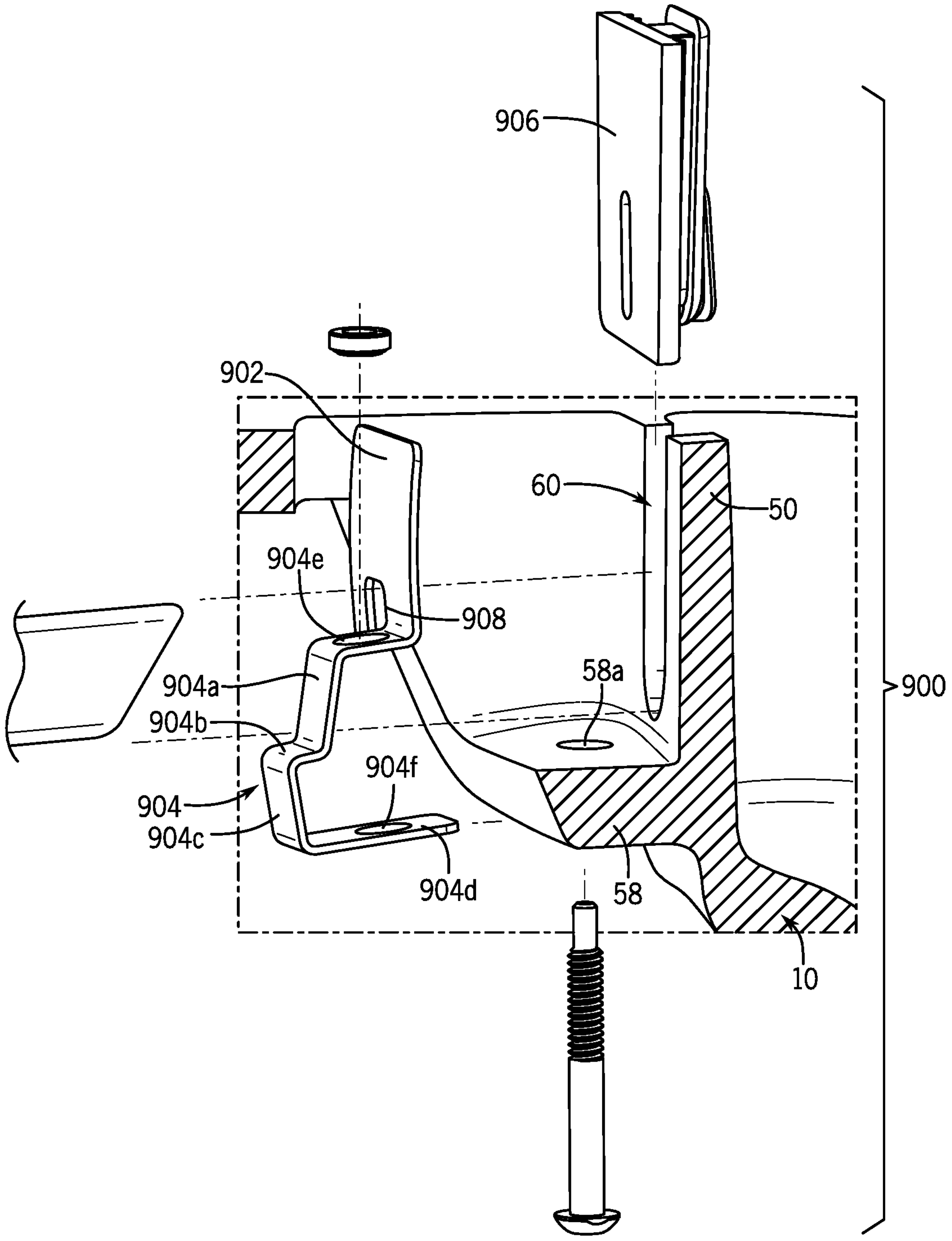
FIG. 31 is an exploded view of the connection FIG. 29.

Yet another exemplary embodiment of a connector assembly 900 is shown in FIGS. 29-31. The connector assembly 900 includes a generally planar support member 902, a retaining body 904, and a sealing member 906. As with other embodiments described herein, the connector assembly 900 can, advantageously, help to maintain a position of the nozzle 200 relative to the rim channel 45 of the toilet body 10. The support member 902 is configured to be positioned adjacent the front surface 50*c* of the wall 50 and has a surface profile that is complementary to the front surface 50*c*. The support member 902 defines an elongated opening 908 (e.g., "U" shaped slot) configured to receive the nozzle 200 therein. As shown in FIG. 29, the support member 902 and the retaining body 904 each surround the nozzle 200 on at least three sides (e.g., a left side, a top side, and a right side). According to another exemplary embodiment, the support member 902 is coupled to the nozzle 200 at or near the second end 208 (e.g., welded or otherwise coupled to the nozzle 200 along a perimeter portion of the nozzle 200, etc.).

Figure 32:
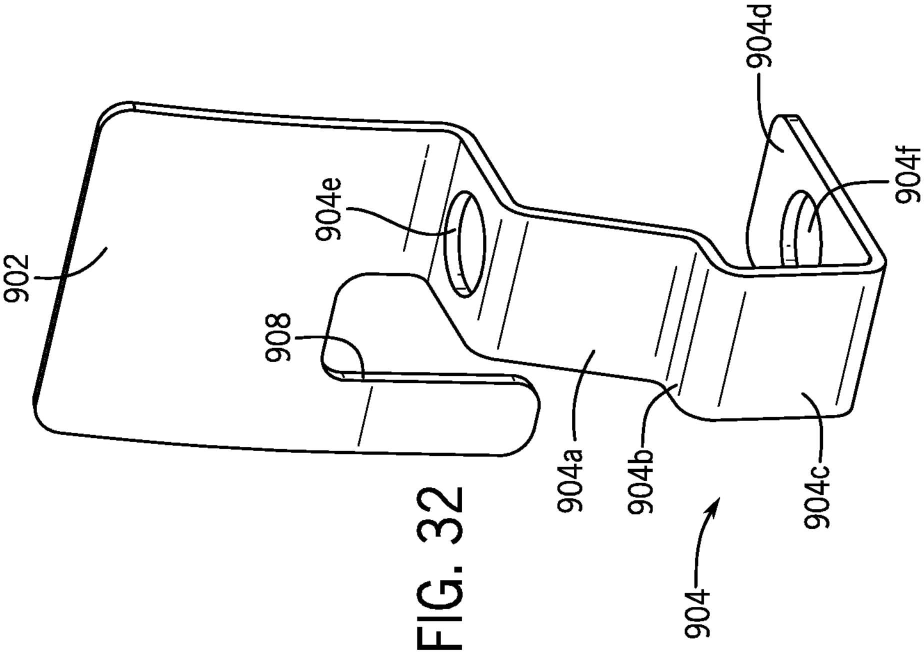
FIG. 32 is a perspective view of a portion of the connection assembly of FIG. 29.
Figure 34:
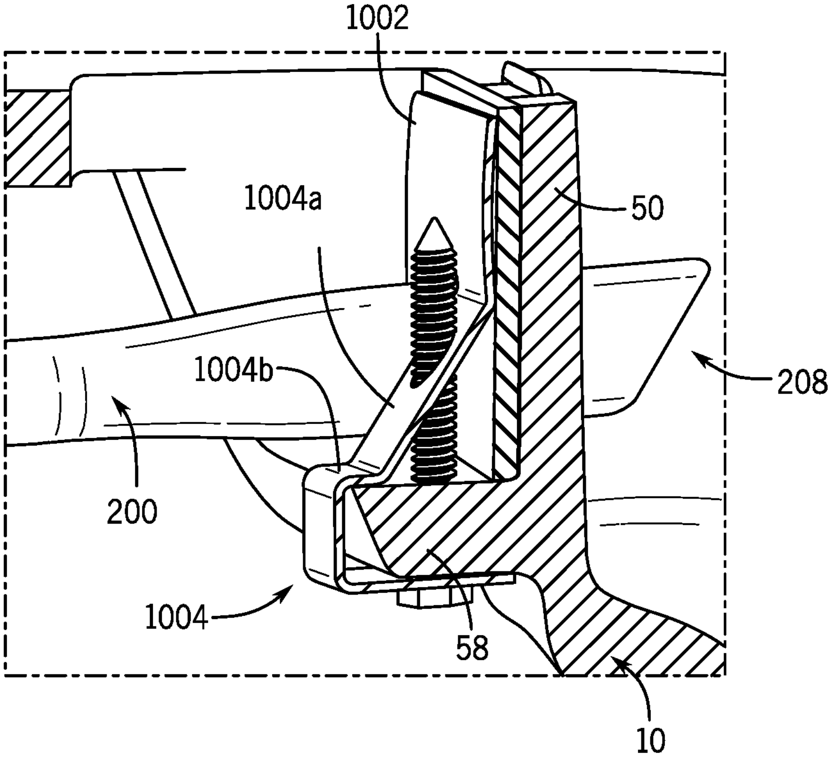
FIG. 34 is a partially exploded view of a nozzle system including a connection assembly, according to another exemplary embodiment.

The retaining body 904 is configured to detachably couple the connector assembly 900 to the toilet body 10 and to adjust an amount of compression applied to the sealing member 906. As shown in FIGS. 29 and 31-32, the retaining body 904 extends forward of the support member 902 (e.g., toward the first end 206 of the nozzle 200) alongside the nozzle 200 and secures the support member 902 to a lower ledge 58 of the toilet body 10 (e.g., a lower ledge 58 extending outwardly from the wall 50 in perpendicular orientation relative to the front surface 50*c*). According to an exemplary embodiment, the retaining body 904 includes a first portion 904*a*, a second portion 904*b*, a third portion 904*c*, and a fourth portion 904*d*. In other embodiments, the retaining body 904 may include additional, fewer, and/or different portions. It will be appreciated that the design of the retaining body 904 (e.g., each portion of the retaining body 904) may be adjusted to suit other toilet body 10 designs. For example, FIG. 34 shows an exemplary embodiment of a retaining body 1004 in which a first portion 1004*a* of the retaining body 1004 is formed as a planar extension that extends in a straight line between a support member 1002 and a second portion 1004*b* of the retaining body 1004. In the exemplary embodiment of FIGS. 29 and 31-32, the first portion 904*a* is subdivided into multiple sections defining at least one step (e.g., ledge, etc.). The upper (e.g., proximal) end of the first portion 904*a* is coupled to the support member 902 adjacent to the elongated opening 908. The first portion 904*a* extends downwardly from the support member 902 at an angle forward of the support member 902 (e.g., away from the wall 50) such that the lower end (e.g., distal end) of the first portion 904*a* is farther from the support member 902 than the upper end. The second portion 904*b* is coupled to the lower end of the first portion 904*a* and extends forward of the first portion 904*a* in perpendicular orientation relative to the support member 902. Together, the third portion 904*c* and the fourth portion 904*d* define a generally "L" shaped structure that is configured to wrap around the lower ledge 58 of the toilet body 10. As shown in FIGS. 31-32, the first portion 904*a* defines an opening 904*e* that is vertically aligned with an opening 904*f* in the fourth portion 904*d* and an opening 58*a* in the lower ledge 58 of the toilet body 10.

As shown in FIG. 29, a fastener, shown as threaded rod 910 (e.g., bolt, screw, etc.), is received through the opening 904*e* in the first portion 904*a*, through the opening 58*a* in the lower ledge 58 and the opening 904*f* in the fourth portion 904*d*. In some embodiments, the opening 904*e* in the first portion 904*a* is threaded. In other embodiments, a nut is applied to the threaded rod 910 or to the first portion 904*a* of the retaining body 904 to urge the first portion 904*a* toward the fourth portion 904*d*. As the nut is tightened, the first portion 904*a* applies a compressive force to the support member 902 to urge the support member 902 against the sealing member 906 (e.g., toward the wall 50). In other words, tightening the nut causes the first portion 904*a* to bend proximate to the lower ledge 58 (e.g., in a clockwise direction) toward the support member 902 to increase the compressive force. In this way, the amount of compression applied to the sealing member 906 by the support member 902 may be adjusted.

Figure 33:
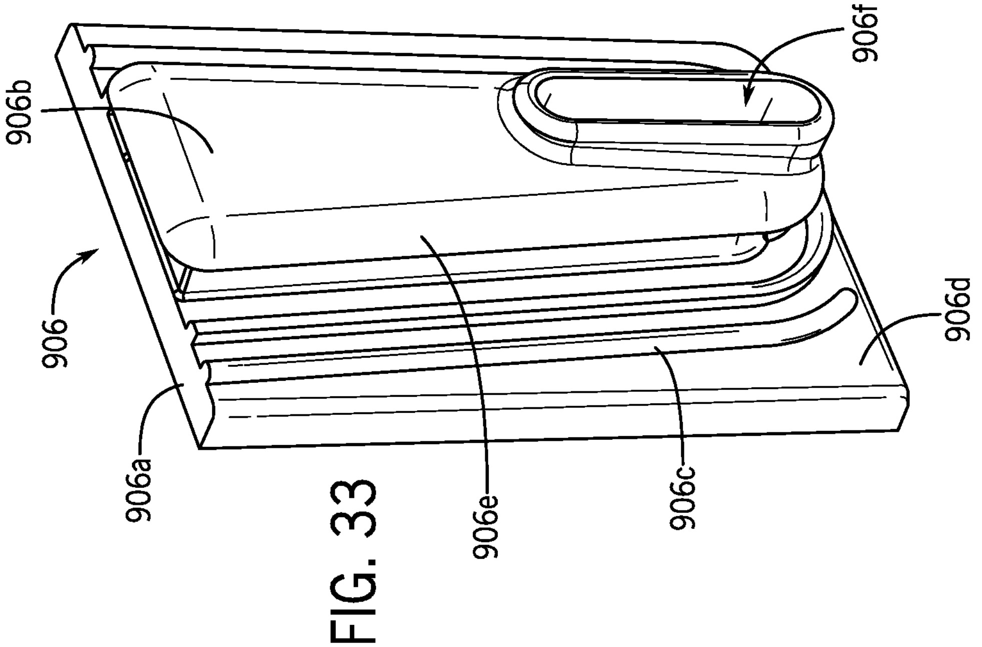
FIG. 33 is a perspective view of a sealing member of the connection assembly of FIG. 29.

As shown in FIG. 33, the sealing member 906 includes a base 906*a* and an extension 906*b* disposed at an intermediate position between opposing ends of the base 906*a*. The sealing member 906 additionally includes at least one rib 906*c* (e.g., projection, etc.) disposed on a rear surface 906*d* of the base 906*a* and substantially surrounding the extension 906*b* (e.g., on at least two sides of the extension 906*b*). The ribs 906*c* are configured to engage with the front surface 50*c* of the wall 50 to prevent water from leaking past the extension 906*b* and into a space forward of the wall 50. The extension 906*b* extends away from the rear surface 906*d* of the base 906*a* in a substantially perpendicular orientation relative to the rear surface 906*d*. The extension 906*b* forms a lip 906*e* that is spaced apart from the base 906*a*. The lip 906*e* defines a channel configured to receive a portion of the wall 50 therein. In other words, the lip 906*e* is configured to extend over a portion of the rear surface 50*b* of the wall 50 when the extension 906*b* is inserted into the opening 60.

As shown in FIG. 33, the sealing member 906 also defines an elongated opening 906*f* configured to receive the nozzle 200 therein (e.g., a portion of the nozzle 200 proximate to the second end 208). The elongated opening 906*f* is sized to be complementary with an outer surface of the nozzle 200 adjacent to (or at) the second end 208, which can, advantageously, help position the nozzle 200 within the opening 60 and prevent rotation of the nozzle 200 relative to the wall 50. In other words, the elongated opening 906*f* is sized and arranged to ensure the correct positioning between the second end 208 and the rim channel 45 (e.g., to ensure that the second end 208 of the nozzle 200 ejects water in a direction that is substantially tangential to the surface 25 of the toilet bowl 20, which can, advantageously, prevent splashing and improve flushing performance). In other embodiments, the shape of the elongated opening 906*f* and/or other elements of the connection assembly 900 may be modified to conform to other nozzle designs/geometries. For example, the elongated opening 906*f* may be circular, oval, or any other suitable shape.

The rim jet nozzle system, of which various exemplary embodiments are disclosed herein, provides several advantages over conventional devices. Unlike conventional devices, the toilet includes a nozzle whose position may be adjusted to reduce splashing and the associated water noise. The adjustability is particularly advantageous for systems in which the water supply pressure is unknown and modifications need to be made during installation. The connector assembly for the nozzle system may be adjusted to modify the compressive force holding the nozzle in place and may be easily detached from the toilet for maintenance and/or replacement of the nozzle. Additionally, the end of the nozzle 200 is shaped (e.g., defines a compound angle) to reduce the possibility of water detaching from the surfaces of the toilet bowl during a flush cycle.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

We claim:

1. An apparatus comprising:

a toilet body including a rear cavity and a wall dividing the rear cavity from a rim channel;

a bracket assembly for coupling a nozzle to the wall of the toilet body, the bracket assembly comprising:

a receiving portion configured to secure the nozzle to the wall of the toilet body;

a first member configured to receive an end of the nozzle; and a second member configured to receive a first fastener for threadably coupling second member to the first member, wherein the receiving portion is configured to receive a second fastener for securing the nozzle to the wall dividing the rim channel from the rear cavity to prevent water from leaking into the rear cavity, wherein an angular position of the nozzle is adjustable without removing the nozzle from the receiving portion of the bracket assembly.

2. The apparatus of claim 1, wherein the bracket assembly is adjustable to allow for modification of a clamping force.

3. The apparatus of claim 1, wherein the bracket assembly is made from a flexible or deformable material.

4. The apparatus of claim 1, wherein the bracket assembly is selectively adjusted relative to the nozzle and the wall of the toilet body to maintain a substantially tangential orientation between the nozzle and the wall of the toilet body.

5. The apparatus of claim 1, wherein the receiving portion of the bracket assembly is configured to constrict in a radial direction toward the nozzle in response to tightening the second fastener.

6. The apparatus of claim 1, wherein the first and second members are configured to effectively clamp to the wall of the toilet body.

7. The apparatus of claim 1, wherein the first member comprises an elongated opening configured to receive at least a portion of the nozzle.

8. A toilet assembly, comprising:

a toilet body including a rear cavity;

a rim area disposed along an upper edge of the toilet body, the rim area including a flange defining an opening; and a nozzle system, comprising:

a nozzle having a first end configured to be fluidly coupled to a water supply conduit and a second end fluidly coupled to the rim area, the second end defining an outlet, wherein the rim area includes a side wall and a ledge disposed at a lower end of the side wall, wherein together the side wall and the ledge define a rim channel, and wherein the outlet is angled with respect to an axis of the nozzle and toward the side wall and the ledge; and a bracket assembly that detachably couples the nozzle to the toilet body such that the nozzle extends through the opening of the flange and is sealed to prevent water from leaking into the rear cavity, wherein an angular position of the nozzle is adjustable without removing the nozzle from the bracket assembly.

9. The toilet assembly of claim 8, wherein the bracket assembly is adjustable to allow for modification of a clamping force.

10. The toilet assembly of claim 8, wherein the bracket assembly is made from a flexible or deformable material.

11. The toilet assembly of claim 8, wherein the bracket assembly is selectively adjusted relative to the nozzle and the toilet body to maintain a substantially tangential orientation between the nozzle and the toilet body.

12. The toilet assembly of claim 8, wherein the bracket assembly is configured to effectively clamp to the toilet body.

13. A toilet comprising:

a toilet body including a rear cavity and the wall dividing the rear cavity from a rim channel;

a bracket assembly for coupling a nozzle to a wall of the toilet body, the bracket assembly comprising:

a receiving portion configured to secure the nozzle to the wall of the toilet body;

a first member configured to receive an end of the nozzle; and a second member configured to receive a first fastener for threadably coupling second member to the first member, wherein the receiving portion is configured to receive a second fastener for securing the nozzle to the wall dividing the rim channel from the rear cavity to prevent water from leaking into the rear cavity, wherein an angular position of the nozzle is adjustable without removing the nozzle from the receiving portion of the bracket assembly.

* * * * *